United States Patent [19]

Wojcik et al.

[11] Patent Number: 4,680,628
[45] Date of Patent: Jul. 14, 1987

[54] REALTIME DIGITAL DIAGNOSTIC IMAGE PROCESSING SYSTEM

[75] Inventors: David R. Wojcik, Woburn; Richard J. Jones, Winchester; James M. Aufiero, Reading, all of Mass.

[73] Assignee: Itek Corporation, Lexington, Mass.

[21] Appl. No.: 568,013

[22] Filed: Jan. 4, 1984

[51] Int. Cl.$^4$ ............................................. H04N 5/32
[52] U.S. Cl. ........................................ 358/111; 378/99
[58] Field of Search ................... 378/99, 100; 358/111; 364/414; 128/654

[56] References Cited

U.S. PATENT DOCUMENTS

| | | | |
|---|---|---|---|
| 3,783,251 | 1/1974 | Pavkovich | 378/99 |
| 4,017,679 | 4/1977 | Kemner et al. | 378/99 |
| 4,449,195 | 5/1984 | Andrews et al. | 358/111 |
| 4,503,459 | 3/1985 | Haendle et al. | 358/111 |
| 4,538,227 | 8/1985 | Toraichi et al. | 358/111 |

OTHER PUBLICATIONS

Jones et al., "Real Time Signal Processing with Two-Dimensional Filters", Proceedings of the Society of Photo-Optical Instrumentation Engineers; vol. 156, *Modern Utilization of Infrared Technology*, IV (1978), pp. 43-48.

Seeley et al., "Computer-Controlled Video Subtraction Procedures for Radiology", Proc. Soc. Photo-Optical Instrumentation Eng. (USA), SPIE vol. 206 (1979).

*Primary Examiner*—Janice A. Howell
*Attorney, Agent, or Firm*—Michael H. Wallach; Robert F. Rotella

[57] ABSTRACT

A fluoroscopic image is processed digitally using a television camera operating at a frame rate of at least 30 frames per second viewing the image and providing an analog video output, a digitizer which digitizes the analog video output to provide digital information representative of the analog signal, a plurality of frame processors which carry out arithmetic and logical operations on the digital image information and are operable at the frame rate of the television camera coupled to the output of the digitizer, a 2-D filter operable at the frame rate of the television camera coupled to said frame processors, a converter and interface to convert digital image information processed in the frame processors and 2-D filter back into an analog signal and television display coupled to the output of the converter for displaying the processed signal.

29 Claims, 16 Drawing Figures

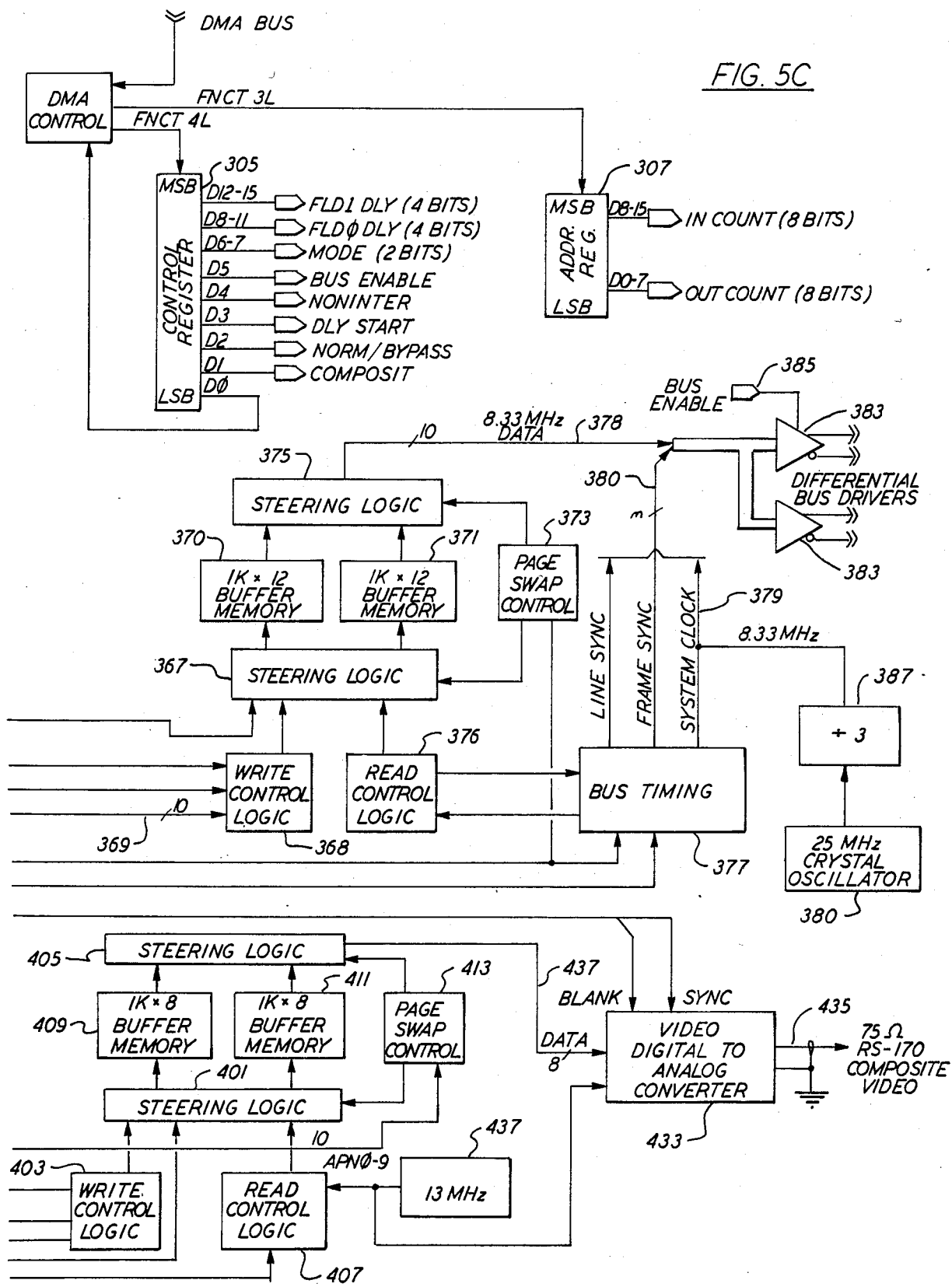

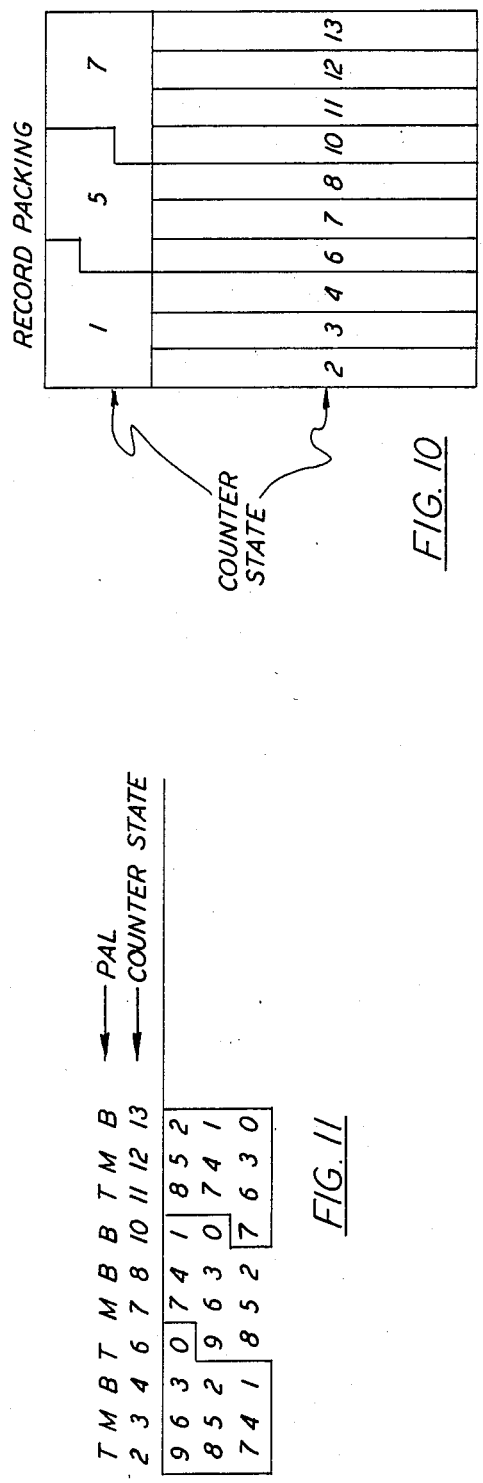
FIG. 10
FIG. 11
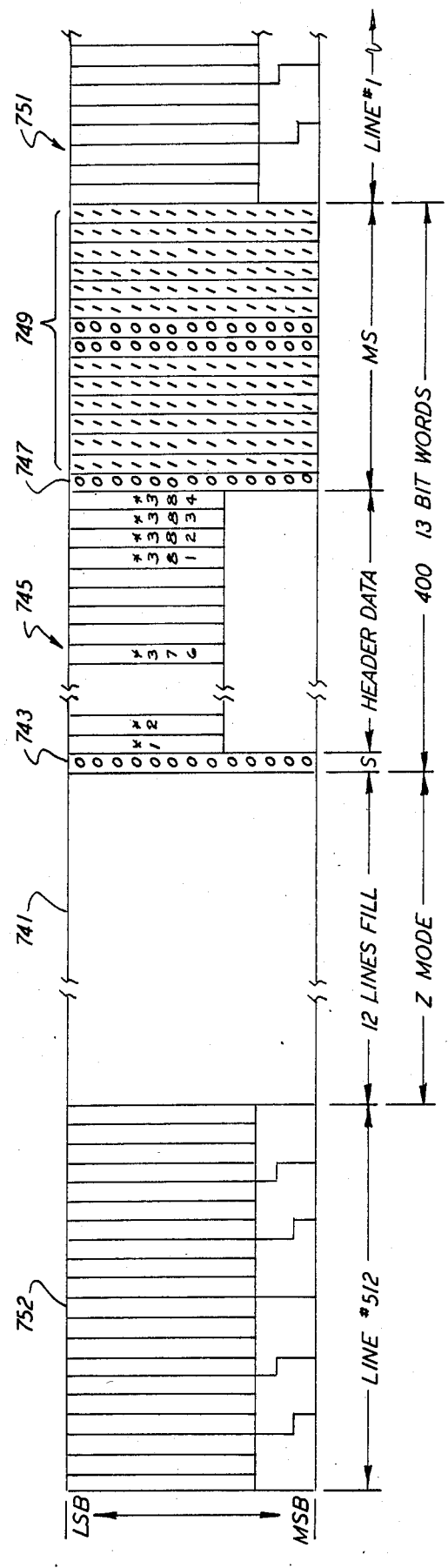
FIG. 9

REALTIME DIGITAL DIAGNOSTIC IMAGE PROCESSING SYSTEM

BACKGROUND OF THE INVENTION

This invention relates to medical electronics in general, and more particularly to an improved digital X-ray image processing system, that utilizes the visual output of an image intensifier, designated fluoroscope, for generating an analog video input signal which is subsequently digitized and manipulated in the digital domain and, finally, reconverted to analog video for review in real time or digitally stored for post examination by physicial, diagnostician.

The use of fluoroscopy in medical dignostic procedures through which invisible X-rays are directed through a patient and converted into visual images by an image intensifier tube, (fluoroscope) which images, through the inclusion of optics, are directed into video or film containing mechanisms, is well know in prior art. A good explanation of the manner in which such is used in the prior art is described in U.S. Pat. No. 4,193,089. While this analog video image permits and examination of the results in real time, the analog film images require subsequent chemical processing and, therefore, are used later for more detailed diagnosis. Digital X-ray or digital radiography utilizes the basic components of fluroscopy up to and including the image intensifier and analog video which is converted into the digital domain for computer manipulation that enhance the basic signal information and allow a series of algorithms to be applied in various real time or post processing steps, determined by the examining physician.

Angiography, the X-ray examination of the major blood vessels using contrast agents, is utilized when a patient is suspected by a physician of having some form of cardiovascular or arteriosclerotic disease. Among the most common procedures are the coronary arteries which supply blood to the heart muscle, the carotids which are the major arteries in the neck providing blood to the brain, the cerebral arteries themselves and the renal arteries which provide blood to the kidneys. The arteries are commom sites of arteriosclerosis which, if properly diagnosed, can be treated surgically or with drugs. Conventional X-ray angiography requires a surgical procedure to permit the insertion of as catheter and injection of contrast media directly into the artery to be examined. This procedure is uncomfortable for the patient, involves a degree of risk and requires hospitalization for three days. Therefore, only highly symptomatic patients are referred for such procedures. Digital subtraction angiography (DSA) permits contrast media to be injected interavenously in certain procedures rather than by arterial catheterization, so that the procedure can be done on an outpatient basis. The computer memory records and X-ray image of the area of the body under study and then subtracts this information from a second X-ray image taken after injection of the contrast media, thereby eliminatinng anatomical structures. Attempts to record coronary artery information with intravenous contrast injections has yet to prove successful. Limited digital recording media and limited transfer rates to digital media has further limited the usefulness of digital techniques in studing the coronary arteries.

There is, thus, a need for an improved fluoroscopy system which permits viewing and recording of fluoroscopic images, in real time via a video display, as a radio-opaque material is injected into or ingested by a patient and the patient irradiated with X-rays, which has sufficient contrast at the time to permit the physician to be assured that the procedure was successful and does not have to be repeated. Furthermore, there is a need to be able to store responses and re-study these television images instead of or in conjunction with film images at a later time.

SUMMARY OF THE INVENTION

The present invention provides such a system. Analog image information generated by a camera which may be an interlaced or progressive scan video camera viewing a fluorographic image, is digitized and supplied to an image enhancement system. The image enhancement system operates under control of a host computer receiving inputs from an interactive terminal with keybord, voice, or light pen inputs. The digitized image is also perferably recorded on a wide-band tape recorder. The output image is provided to a black-and-white monitor. Image information can also be provided, after off-line processing and enhancement, to a color monitor. Preferably, the host computer is equipped with an modem to permit remote transmission of the information for analysis to and from remote locations, if desired.

The system described herein uses a high speed, high density digital recording media that permits full bandwidth capture of $512 \times 512 \times 10$ bit digital data stream.

The composite elements of the system including a real time 2-D filter, a multiplicity of image buffers and the frame processors and the real time high density digital storage media are intended to permit examination procedures of the coronary arteries in a less invasive, less costly, less time consuming manner.

Whereas present film techniques of coronary arteries require the catheter to be inserted directly into the artery selected for examination and the radio-opaque dye injected directly into the artery to obtain sufficient contrast in the resultant film image, digital techniques with inherently greater contrast detectability characteristics can allow an examination procedure to be conducted by placing a catheter in the region of the origin of the coronary artery and still provide sufficient contrast detectability even with the dilution of dye by the blood.

The filtering, transfer and reconstruction and recording of the entire process is obtained at thirty images per second thereby permitting the results of the examination to be reviewed in real time as well as post examination with the uncontaminated, pure digital data base that was recorded as the procedure was conducted.

The image enhancement system is the essential part of the system which permits generating an enhanced image which gives the system its advantages over the prior art permitting carrying out diagnostic procedures with dilute levels of radio opaque material. This, in turn permits catheterization which is less invasive to the specific coronary artery, substantially reducing the risks involved, for example, in obtaining a coronary angiogram.

Digitized information is operated upon in a plurality of frame processor modules and in the two demensional (2-D)filter. Various combinations of frame processing and filtering are available to carry out different types of image processing. For example, conversion between interlaced and noninterlaced formats is carried out when required, in three frame processors (one to deinterlace and two to re-interlace). Other frame processors provides arithmetic logic for mask processing. One frame processor is simply used for image storage for downloading.

An important part of the image enhancement system is the 2-D filter. This filter is of the general nature described in the article "Real Time Signal Processing With Two-Dimensional Filters" by Jones et al., from the Proceedings of the Society of Photo-Optical Instrumentation Engineers, Volume 156, *Modern Utilization of Infrared Technology*, IV (1978), pp. 43–48. The 2-D filter is a filter which carries out a two dimensional convoltion utilizing a scanning kernal in order to intensify differences between boundaries which are close on the grey scale to enhance these edges. The filter, thus, for example, enhances the boundary between a dye within the lumen of an artery and the artery wall. The physician carrying out the diagnosis, because of this enhancement, can immediately see whether the procedure is being effective and, if necessary, re-run it.

Perferably, a wide-band tape recorder is associated with the system. Stored on the wide-band tape recorder is the digitized information from the digitizer before processing. The use of such a wide-band tape recorder permits storing this information in real time and reprocessing it as many times as necessary under different conditions at a later time to carry out more detailed diagnosis. Thus, a particular configuration of the image enhancement system during the diagnosis procedure does not fix the recorded image. The recorded image can be played back through the system under many different configurations, each of which can provide different types of enhancement to aid in diagnosis.

Furthermore, header information identifying the patient and all conditions during diagnois is also be recorded on the wide hand tape recorder for identificatin and searching purposes.

BRIEF DESCRIPTION OF THE DRAWINGS

FIG. 9 is a schematic presentation of the manner in which data is recorded on a wideband tape recorder.

FIG. 10 illustrates in more detail the packing of a group of 13 pixels into ten 13 bit words.

FIG. 11 shows in more detail the manner in which the programmable logic array breaks up the first, fifth and ninth words and adds them on to the 10 bit words of the remaining ones of a group of 13.

FIG. 14 is a chart illustrating a transformation table utilized for joystick window control.

DETAILED DESCRIPTION OF THE INVENTION

Figure 1:
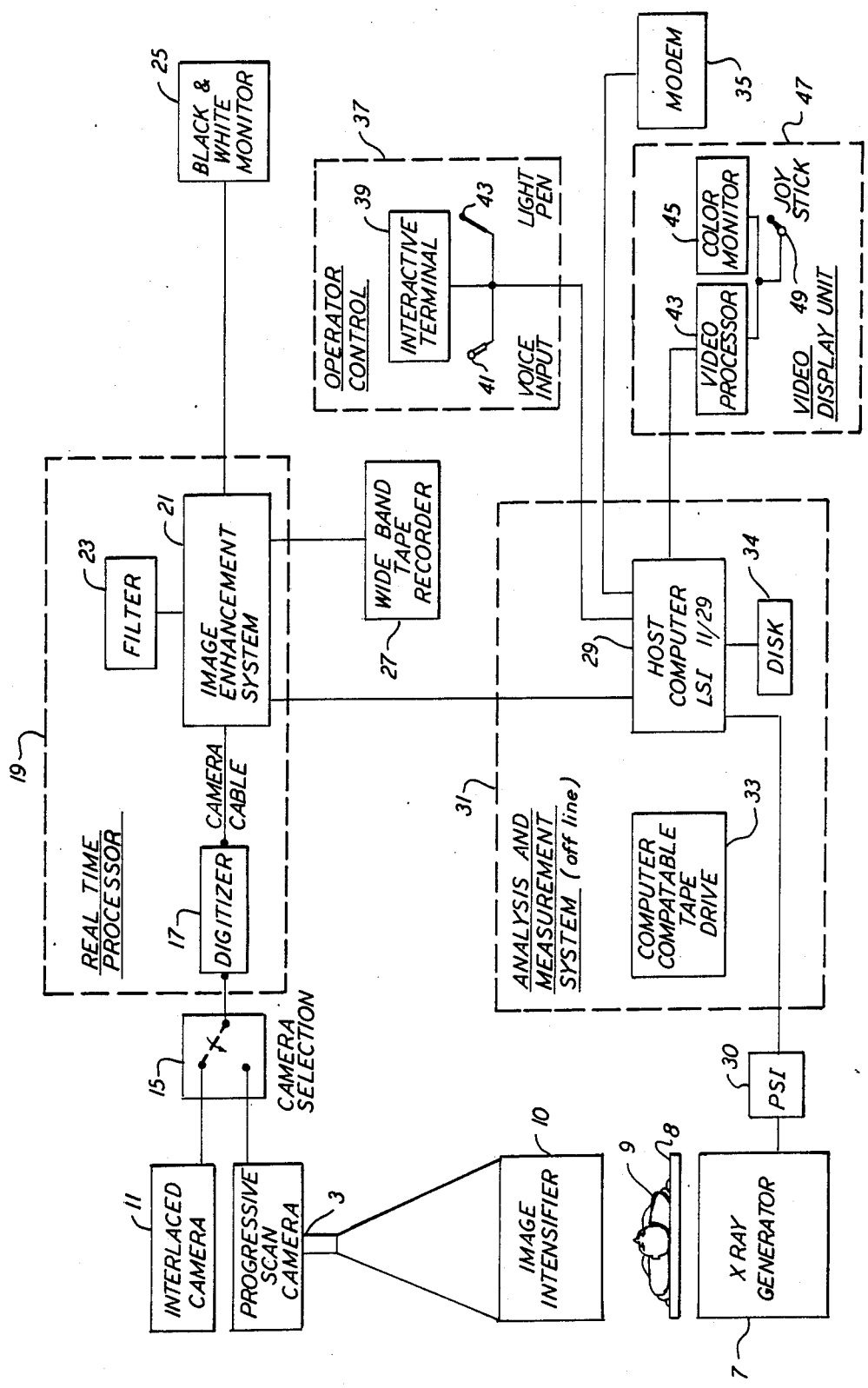
FIG. 1 is a block diagram of the overall system of the present invention.

FIG. 1 is an overall block diagram of the system of the present invention. An X-ray generator 7 passes X-rays through a patient 9 on a table 8. The radiation passing through patient 9 is imaged on an image intensifier 10 which converts the X-ray radiation into a visible image. As illustrated, either an interlaced camera 11 or progressive scan camera 13 may be used to view the image. One of the camera outputs is coupled through a switch 15 into a digitizer 17 within a real time processor 19.

The real time processor includes, in addition to the digitizer 17, an image enhancement system 21 with which there is associated a 2-D filter 23. One output from the image enhancement system is provided to a black-and-white monitor 25. Another output is provided to a wide band tape recorder 27. The image enhancement system is under the control of a host computer 29 in an off-line analysis and measurement system 31. Associated with the host computer is a computer tape drive 33 and disc drive 34. Also provided, coupled to the host computer 29, is a modem 35 permitting communication with remote locations. The host computer 29 receives inputs from an operator control 37 which includes an interactive terminal 39 having a voice input 41 and a light pen input 43. In addition to the outputs provided to control the image processing, outputs are provided to a video processor 44 and color monitor 45 in a video display unit 47 used in off-line processing with the image enhancement system. The computer 29 also controls X-ray generator 7 through a programmable system interface 30. To provide additional control over the video processor and color monitor a joystick 49 is provided.

Figure 2:
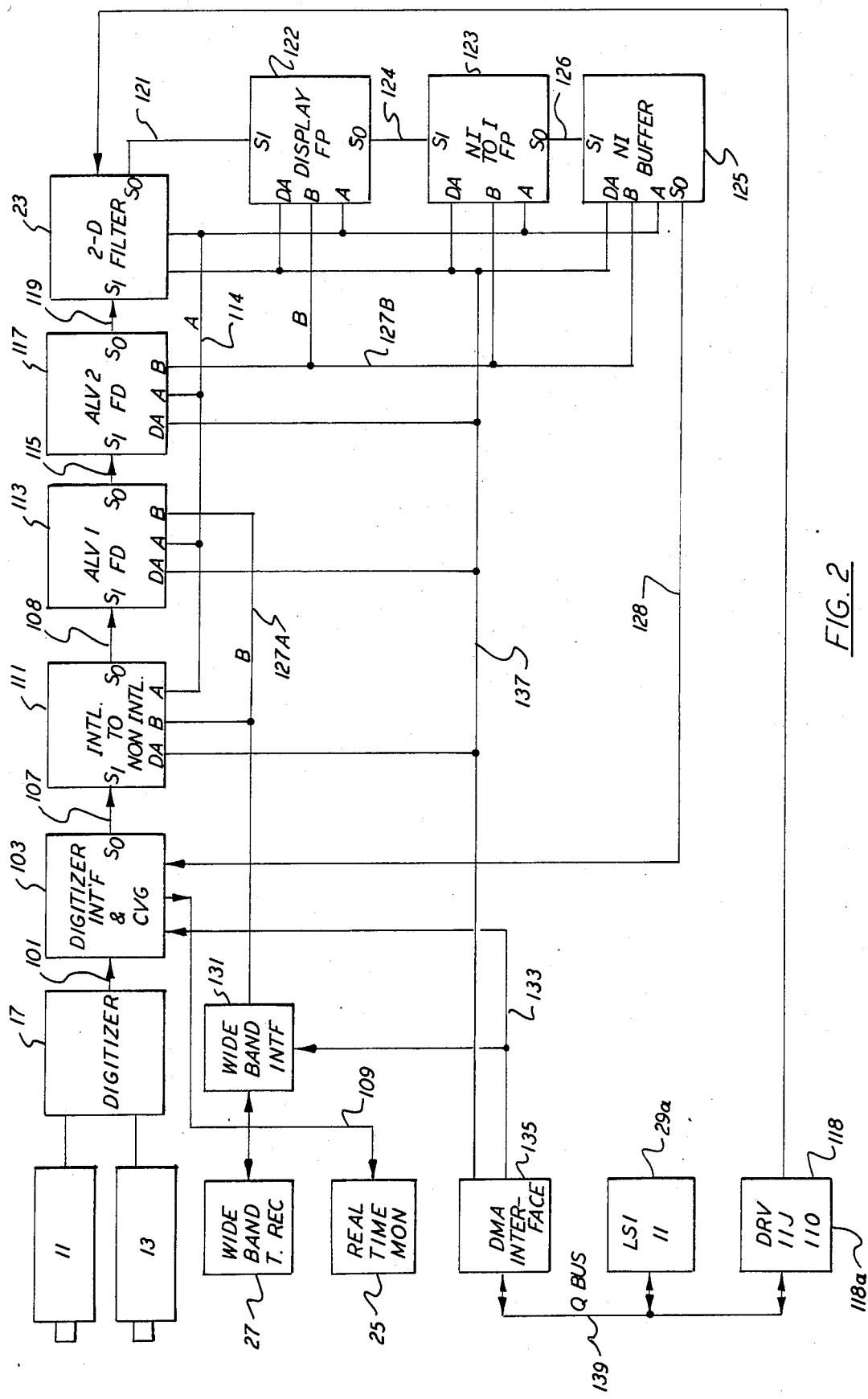
FIG. 2 is a more detailed block diagram of the real time of processor portion of the system of FIG. 1 showing interconnecting buses.

FIG. 2 is a more detailed block diagram of the image enhancement system showing its various interconnections. The output of the camera 11 or 13 is provided as an input to digitizer 17. The output of digitizer 17 on a bus 101 is an input the digitizer interface and composite video generator 103. The digitizer interface has two outputs. A bus 107 is provided as an input to a de-interlace frame processor 111. A line 109 containing processed analog video information is coupled to monitor 25.

The output of the de-interlaced frame processor, which is used to deinterlace an interlaced input, is provided as an input to a first arithmetic and logic unit (ALU) frame processor 113 over bus 107. The manner in which this is accomplished is disclosed in detail in U.S. Pat. No. 4,532,546 entitled Rear Time Single Frame Memory For Converting Video Interlaced Formats filed on even date herewith and assigned to the same assignee as the present invention. The output of this first frame processor 113 is provided on a bus 115 to a second frame processor 117. Frame processor 117 can also receive an input directly from frame processor 111, bypassing frame processor 113 over the "A" bus 114. This bus also connects to frame processor 111 and with other units to be described below. The output of frame processor 117 is provided on bus 119 which is coupled into the 2-D filter 23. The 2-D filter 23 can also receive an input from the "A" bus 114. The 2-D filter recieves instructions from the LSI-11 through a DRV11J parallel programable I/O port. The output of the 2-D filter is on a bus 121 which is provided as an input to a display frame processor 122, which provides its output on bus 124 to an interlace frame processor 123. Interlace frame processor 123 works with a further frame processor 125, to which it is coupled by bus 126, used as an interlace buffer to re-interlace the signal. All of these frame processors can also receive an input from the bus 114.

Display frame processor 122 is used for storage and downloading. The interlace frame processors 123 and 125 put the deinterlaced digitized information back into an interlaced format from which it is coupled via bus 128 to digitizer interface 103, which contains a composite video generator, which converts the digital information into an analog video signal which can then be displayed on the black and white monitor 25. Each of the various frame processors is also coupled to the "B" bus 127A or 127B. Furthermore, a direct memory access or DMA bus 133 via a DMA inteface 135, provides direct access to the memory associated with host computer 29 of FIG. 1. DMA interface 135 is also coupled to each of the other units over the DA bus 137. Information to and from the host is via bus 139 and LSI-11 29a. It is on this bus that commands for each of the frame processors, the 2-D filter, the digitizer and wideband tape interface 131 are provided to set up the system configuration, as described below.

The digital image is digitized into an array of 512 by 512 pixels. Each pixel is represented by 10 bits. The frame processors are capable of performing the functions of read, write, add, subtract, negate, exclusive or, and intensity transformation. These functions are utilized to carry out the interlacing and deinterlacing mentioned above, to do mask subtraction, display buffering, perform arithmetic logic and carry out incremental subtraction etc. The direct memory access permits the host processor 29 to control the individual frame processors and 2-D filter. The data transfer rate over this bus is approximately 500,000 words per second (in bursts).

Preferably, the wide-band tape recorder 27 is a Honeywell HD-96 or equivalent. Real time data can be stored into this recorder at rates of 1, 2, 3, 4.28, 5, 6, 7.5, 12 and 30 frames per second.

The recorder is capable of playing back at variable speeds through the interface from 1 to 30 frames per second. The maximum transfer rate is 83.3 megabits per second, allowing approximately 7.5 minutes of data at 30 frames per second or $3.7 \times 10^{10}$ usable bits to be recorded per reel. Data is recorded and played back using an NRZ-L code. The wideband tape recorder interface 131 permits the control of the wide-band recorder by the host computer including annotation. Frame identification characters and frame counts are added to allow search and knowledge of the real time processor configuration when the data was recorded. However, as noted above, only unprocessed data is stored.

The video display system 47 of FIG. 1 is, for example, a commercially available DEANZA I.D. 5512 with color display. This is used to provide pseudo-color, grey scale thresholding, gray scale expansion, contrast enhancement, histogram generation and alpha-numeric display. Included is an image intensity transformation memory (ITT). In conjunction with the joystick 49 of FIG. 1 it is also used to provide linear and area measurements. It is equipped with a LSI-11 DMA card to permit it to interface with the LSI-11/23 computer through a Q bus converter located in LSI 11/23 back plane. Thus, the host computer 29 is preferably a DEC LSI 11/23. CPU with 256K bytes of random access memory, 4 serial EIA lines, 1 Q-verter, a 500 KHz DMA card, 1 DRV11-J parallel I/O card 118, DSD 880 floppy/Winchester system 34 and interface. The tape drive 33 is preferably a 9 track computer compatible tape recorder and interface operable at 1600 BPI and 125 IPS.

The operator controls 37 will preferably include an ISC 800 IG color terminal 39 with light pen 43, keyboard and voice input control 41. Included will be a programmable system interface to permit controlling and monitoring of the external systems consisting of a general purpose DEC I/O board with a software driver.

THE INTERLACE AND NON INTERLACE FORMATS

The interlaced configuration in a standard television camera has an aspect ratio of 4:3. That is to say it is 4 units wide and 3 units high. The sequential camera on the other hand normally has a 1:1 aspect ratio, i.e., it produces a square picture. It is desirable to process square pictures and square pixels in the image. Furthermore, the image intensifer tube is generally circular, and in any case does not have an aspect ratio of 4:3. Thus, even if a conventional television camera with interlaced scan and 4:3 aspect ratio views an image intensifer the image is con within a square. The system of the present invention is set up to operate on an array of 512 by 512 square pixels each represented by 10 bits of information.

Figure 3:
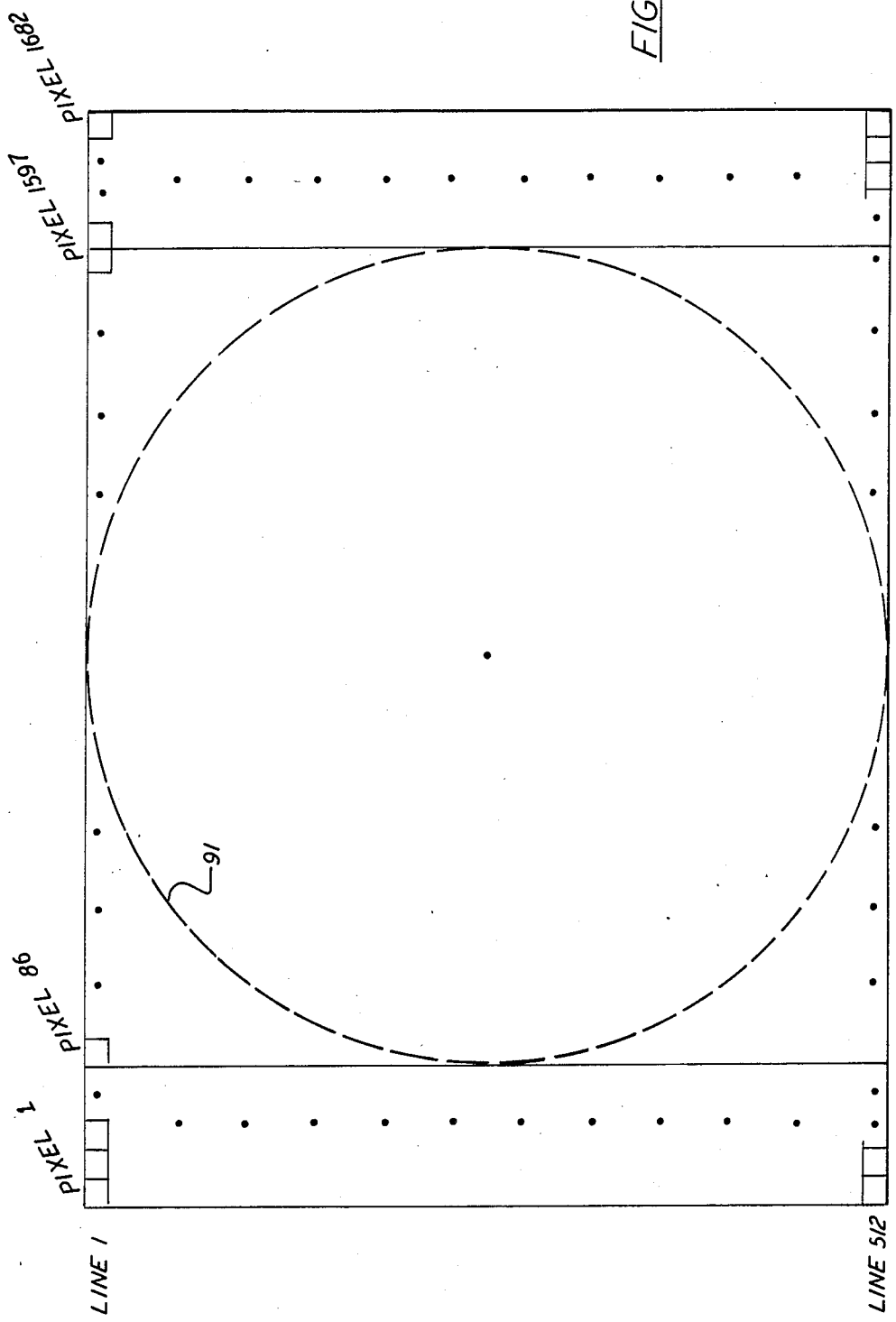
FIG. 3 is a diagram helpful in understanding how an interlaced picture with a four to three aspect ratio is converted into a square array of digitalized pixels.

As illustrated by FIG. 3, if one considers a line of pixels on a television raster with a 4:3 aspect ratio and 512 lines of vertical resolution, if square pixels are to be generated, across each line there will be approximately 4/3 times 512 or 682 pixels. The image information will be contained within the 512 pixels in each line in the center of the screen on which the circular image intensifier image 91 is located. Thus, in processing the image, when it is obtained from a conventional interlaced camera, there should be a delay at the beginning and end of each horizontal scan: For example, as indicated by FIG. 3 conversion should start only when, e.g., pixel 85 is reached and continue for 511 additional pixels to pixel 596. The manner in which this delay is implemented will be seen below. This then gives the 512 by 512 array of square pixels.

Similar delays have to be introduced when converting the image back into analog format i.e. only in the area between pixel 86 and pixel 597 should video information be provided on the output from the digitizer interface.

The system of the present invention is based on operating at a basic horizontal frequency of 10 MHZ. That is to say, assuming a square sequential scan input, information is converted at a pixel rate of 10 MHZ. There is a certain amount of time allotted for scanning across a line and converting 512 pixels at this rate, plus a time for retrace. When scanning a tube having a 4:3 aspect ratio as in FIG. 3, one and one-third as many pixels must be scanned in this time. Thus it is necessary to accelerate the rate of data conversion by four-thirds in order to scan the 512 pixels in the center portion of the screen within the allotted time. For this reason, at the input, and again at the output, a 13 MHZ clock accelerator is provided to carry out the necessary acceleration for the 4:3 aspect ratio of the input and the display output.

Finally, it is difficult with presently available hardware to carry out frame processing in the frame processors at 10 MHZ. Since there is, in a scanning corresponding to a conversion at 10 MHZ, a considerable amount of time utilized in retrace, it becomes possible to utilize this time for computation within the frame processors, and, thus, information is operated on continuously in the frame processors at a frequency of 8.33 MHZ. While, this operation is continuous, lines of information are read in to the system in bursts, with gaps in between to take into account retrace.

On the different buses throughout this system, in additional to the digital information being transferred, there is also timing. The basic elements in timing are the line frequency or a line sync signal and the frame frequency or a frame sync signal, in addition to the system clock at 8.33 MHZ or 10 MHZ.

DIGITIZER AND INTERFACE

The basic purpose of the digitizer and digitizer interface is to take information in analog format from a television camera or to take information from another source or a test pattern and get into a form in which it can be processed by the frame processors, i.e., to get it at the proper frequency and with the proper synchronization signals. In addition, the other end of the digitizer interface system takes the processed data which is being input to the digitizer at the system frequency of 8.33 MHZ and converts it into the necessary output frequency of 13 MHZ to display on the conventional T.V. display which has a 4:3 aspect ratio.

Figure 4:
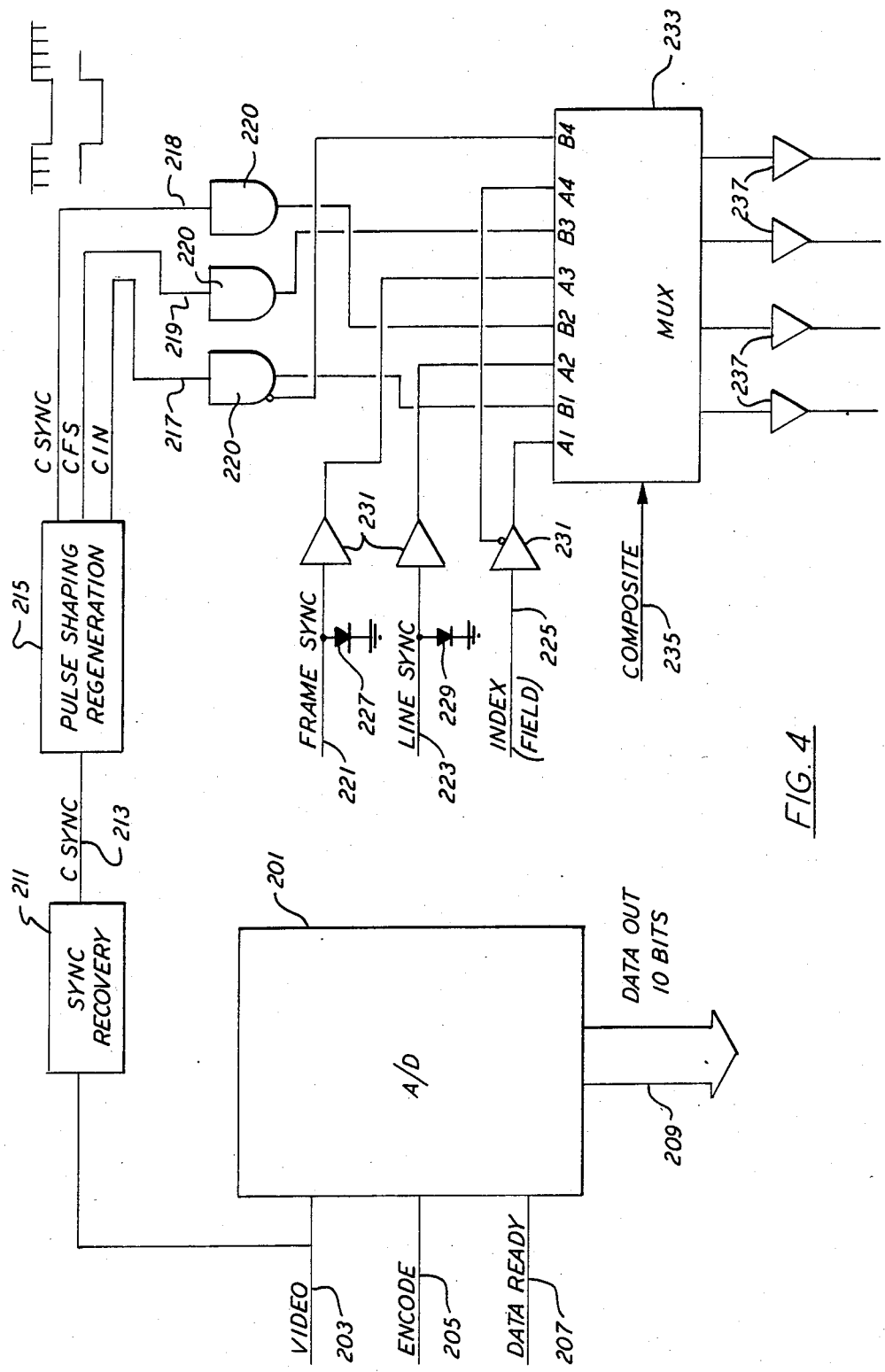
FIG. 4 is a block diagram of the digitizer of the present invention.

FIG. 4 is a block diagram of the digitizer. At the heart of the digitizer is an analog-to-digital converter 201 receiving a video input on line 203 from either an interlaced camera or a sequential scan camera. An input on line 205 is an encode command to the converter and an output on line 207 a data-ready output. A data output of 10 bits of data is provided on a data bus 209. The converter may be an Analog Devices Model 1020 for example. In addition to converting the video information, the digitizer also includes a sync recovery circuit. The video signal, assuming that an interlaced scan with composite sync in the video signal is provided, is coupled into a sync recovery circuit 211 of conventional design where the sync is separated out from the video to provide a composite sync signal on line 213. This composite sync signal is coupled to a pulse shaping and regeneration circuit 215 made up, primarily, of a group of monostable multivibrators from which three signals are provided as outputs. The first is the composite sync in line 218 which will include both a vertical and horizontal sync information, a signal labeled CFS on line 219 which is the frame sync and a signal designated CIN on line 217 which is a short pulse occurring at the fieldtime, i.e, occurring at the division between odd and even fields. Each of lines 217–219 is provided to an AND gate 220.

As indicated above, the system must also work with a sequential scan camera. Such a camera provides as outputs a frame sync signal which is an input on line 221, a line sync signal which is an input on line 223 and a frame index signal which is an input on line 225. Lines 221 and 223 are clamped by zener diodes 227 and 229, respectively. Each of the three lines is coupled into a line receiver and driver 231 having uninverted and inverted outputs.

To select betweeen either the recovered sync from the pulse shaping and regeneration circuit in the case of interlaced scan or incoming signals on lines 221, 223 and 225 in the case of sequential scan, a multiplexer 233 is provided. The inverted index signal and the inverted CIN signal from a gate 220 are provided to one set of inputs. Tne frame sync signal and CFS signal are provided to another set of signals inputs. The composite sync and line sync are provided to a third set of inputs and the index signal and not inverted CIN signal to the fourth set of inputs. One of the two sets of inputs is selected in accordance with a command labeled "composite" on line 235. When composite video is present, i.e., when interlaced scan is being used, this signal will cause the outputs of pulse shaping and regeneration circuit 215 to be used. Where a sequential scan camera is used, it will cause the signals on lines 221, 223 and 225 to be used. These signals are provided as outputs through line drivers 237 to the remainder of the system.

Figure 5A:
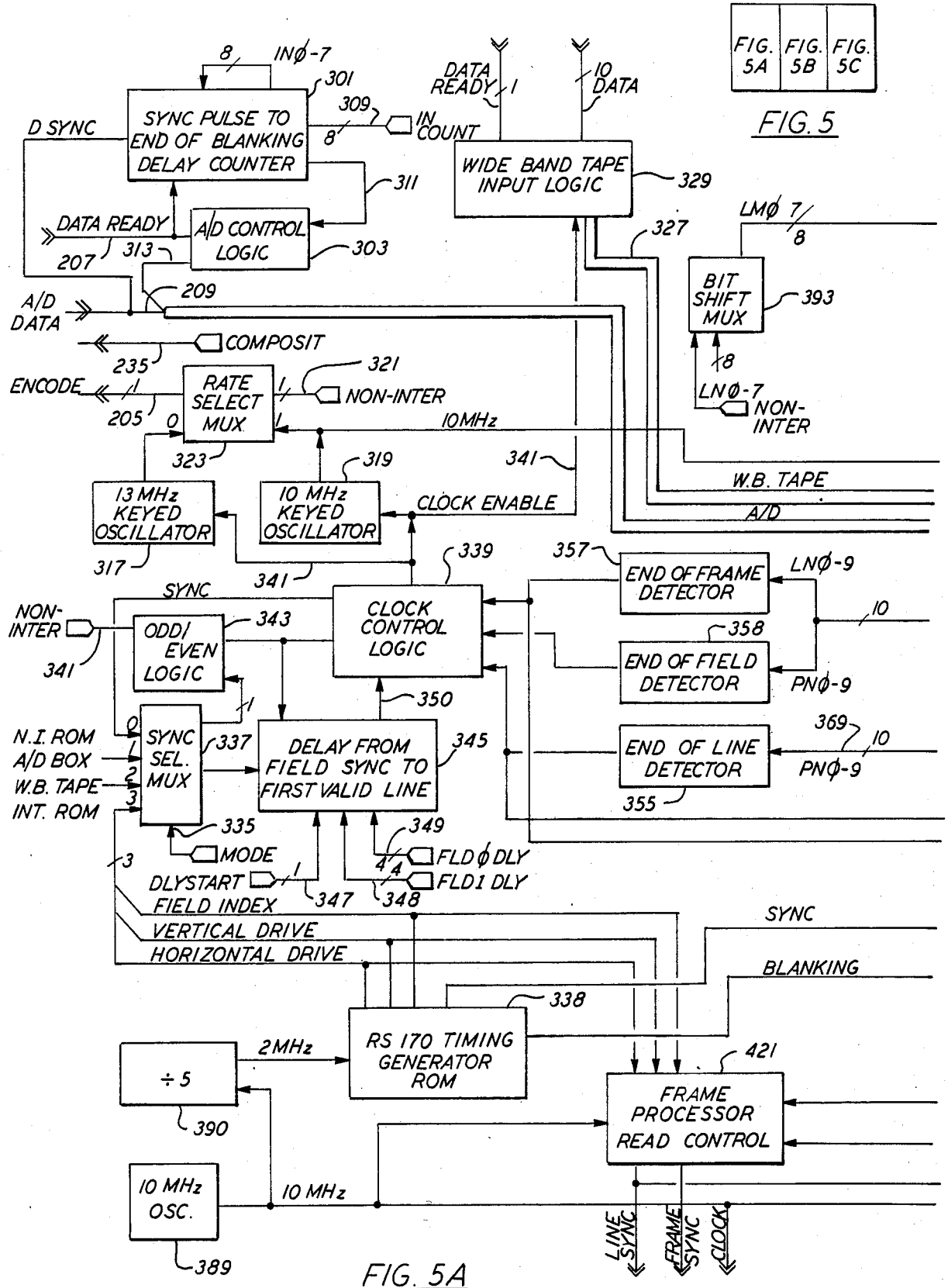
FIG. 5 is a block diagram of the digitizer interface of the present invention.
Figure 5B:
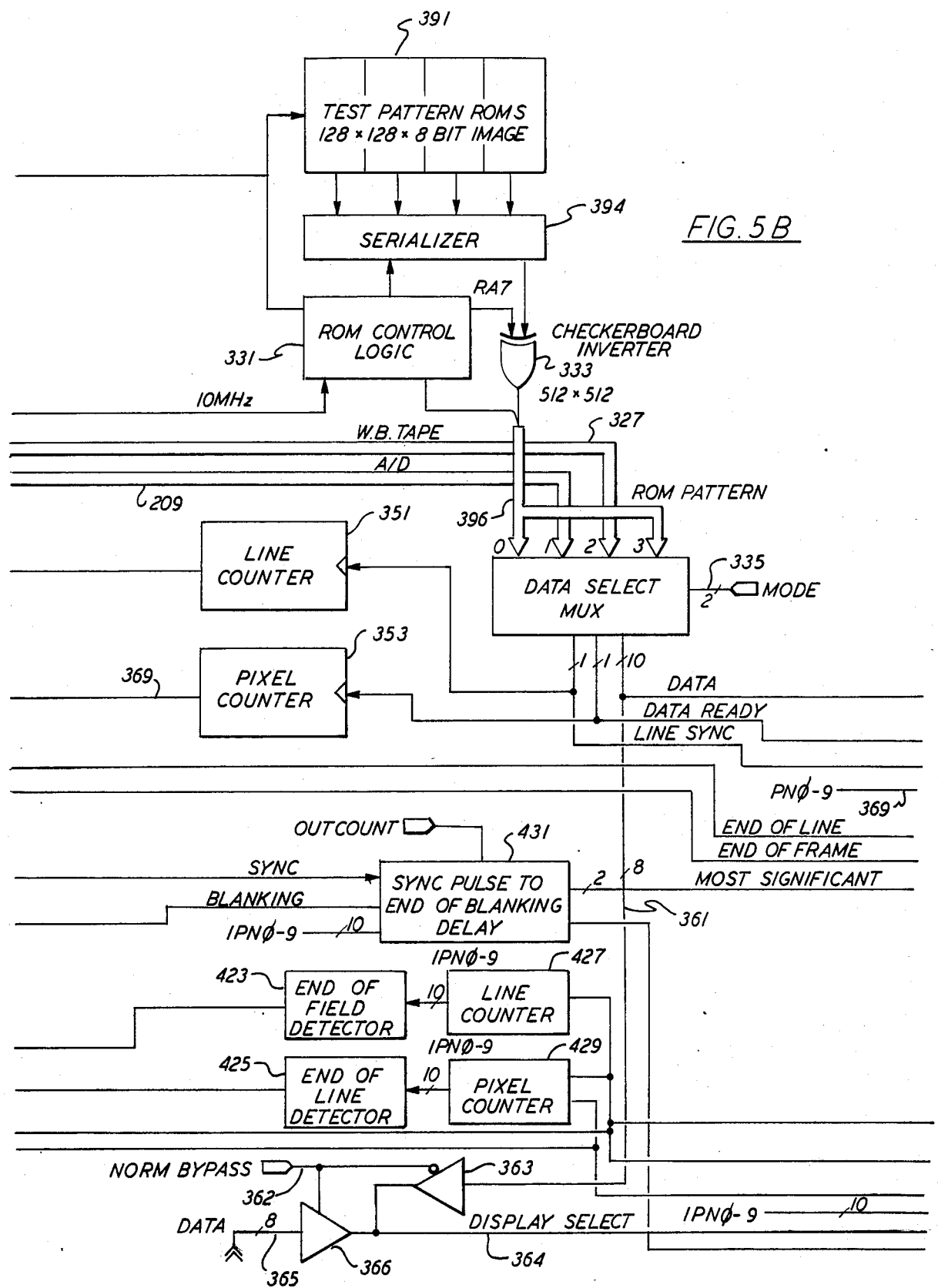

FIG. 5 is a block diagram of the digitizer interface. This interface is actually more than a digitizer interface. It interfaces the system not only with the digitizer but with the output real time output monitor 39 of FIG. 1, provides test patterns and generates various types of control and synchronation signals for use throughout the system. It also does various types of input and output conversions and provides the output to the display through a digital-to-analog converter. Also included in this section of the system and used therein are DMA, i.e., Direct Memory Access, inputs from the host processor which configure the system and set it up for the type of operation desired.

Referring to the upper left-hand corner of the FIG. 5A are located blocks 301 and 303. Block 301 is a syncpulse to end of blanking delay counter. Block 303 is analog-to-digital converter control logic. A-D control logic 303 receives as one input the data-ready signal of the line 207. Adjacent line 207, bus 209, to which a signal from the logic circuit 303 is added, is visible. Adjacent that, the "composite" output which controls the multiplexer 233 of FIG. 4, on line 235 is visible. Directly below that line is the encode line 205 discussed above in connection with FIG. 4. The "composite" signal on line 235 is obtained from a control register 305 which receives an input from the DMA bus. When the control register is selected, by the signal labeled FNLT-4L, the values on the DMA bus are stored in the contro register providing control information. On the other hand, when signal FNLT3L is present information is loaded into the address register. This includes the words, "Incount" and "outcount" "In count" indicates when it is time to begin inputing to the system, i.e., to begin using the input on bus 209 and processing it.

The conversion in the analog-to-digital converter 201 of FIG. 4, was carried out in response to the encode signal 205. The encode signal consists of a pulse train having either a frequency of 13 MHz obtained from an oscillator 317 or 10 MHz obtained from an oscillator 319. Which of the two rates are provided on the line 205 is determined by the input designated "Noninter" on a line 321 to a rate select multiplexer 323. The reason for this is that, as explained above, if noninterlaced information is being provided, it is in a 512×512 pixel format, i.e., it has a 1:1 aspect ratio. The normal interlaced scan, however, has a 4:3 aspect ratio. Because of this, and since processing is done at the 10 MHz rate, the input rate must be accellerated by a ratio of 4/3 or to 13 MHz. Thus, to scan properly this higher frequency must be used but delay counter 301 must delay until the 85th pixel is reached as described above.

The data from the analog-to-digital converter is provided as an input to a data select multiplexer 325. The data select multiplexer can select data from four separate inputs. One input, bus 209 is coupled to the analog-to-digital converter and a second 327 is coupled to a spare external input 329. Third and fourth buses are coupled to RAM control logic 331 and an exclusive OR gate checker board inverter 333. Which of the inputs is selected is determined by a two bit control signal from control register 305 called "mode" which is provided as an input to the multiplexer 325 on line 335. The "mode" input of line 335 is also an input to a sync-select multiplexer 337 at the left-hand side of the figure. The sync-select multiplexer has four, three line inputs. These are, respectively, a noninterlace RAM input, an analog-to-digital input, a spare external input and an interlace RAM input. In the case of the analog-to-digital converter, the outputs which are provided as inputs are the outputs from drivers 237 described in connection with FIG. 4.

For the moment, we will assume that the analog-to-digital converter has been selected. The 10 MHz oscillator 319 and 13 MHz oscillator 317 are controlled by an output from clock control logic 339 on line 341. This determines when these keyed oscillators are turned on and turned off to read in data. Which of these is selected will, of course, be determined by whether or not there is a interlaced or noninterlaced input. Thus, the noninterlaced control signal from control register 305 is provided on a line 342 into an odd/even logic block 343 where it is combined with a first output of the sync-select multiplexer, the output corresponding to the index signal or representing field switchover. The field sync and line sync are provided as inputs to a block 345 labeled "delay from field sync to first valid line." This is a delay which is controlled by additional control signals from control register 305 on lines 347, 348 and 349 labeled "delay start," "field zero delay" and "field one delay," the last two representing the odd-and-even or even-and-odd field delays, respectively. These are delays which are programmable through the host processor and the control register, each having four bits of data to take into account system delays. Thus, in dependence on these inputs, there is a start delay and a delay in each of the two separate fields. At the required time after the desired delay, an output signal is provided to clock-control logic 339 on line 350.

As indicated, an output of the control logic 303 on line 313 is added on to the 10 bit bus 209. This is, in effect, a signal at the pixel or data rate, is also provided and corresponds, in frequency, to the data-ready signal on line 207. Also provided through the multiplexer 325 is the line sync signal. For a video input, the line syne is the signal "DSYNC" which is delayed to take into account the delay necessary in converting to a square image. These pixel rate and line sync signals out of the multiplexer 325 are provided, respectively, to a line counter 351 and a pixel counter 353. The output of the pixel counter is provided to an end-of-line detector 355 and the outputs of the line counter 351 to an end-of-frame detector 357 and an end-of-field detector 358. The outputs of each of these detectors provide inputs to the clock control logic. Thus, the clock control logic, having enabled the necessary clock 317 or 319 after the programmed delay, continues to enable the oscillator until the end of a line is reached. After the end of the line, there is a certain delay or retrace time. At the end of this time, the oscillator is, again, enabled. If interlace is in use, it is necessary to detect the end of the field for vertical retrace.

Similarly, it is necessary to detect the end of the frame whether it be interlaced or noninterlaced to allow for vertical retrace. Thus, the clock control logic uses the signals from the three detectors 355, 357 and 358, along with the delay control signals on line 350, to turn the clock 317 or 319 on and off to read the data in at the desired times and the desired rates. The data comes out of the multiplexer on 325 on line 361. In one mode of operation known as "bypass" and controlled by a "normal/bypass" control signal from the control register 305 on line 362, the data is coupled directly through a series of drivers 363 to an output data bus 364. A second input to this bus is on a bus 365 which is coupled through a driver 366 to the bus 364. This is the processed data input.

Normally, however, data is supplied to steering logic 367 under control of write control logic 368 which directs it into buffer member memories 370 and 371. Data is alternately put into one memory or the other with the control of which memory is used done by means of a page swap control 373 which is driven by the end of line signal from end of line detector 355. The write control logic receives the data ready signal and the line sync signal from the multiplexer 325. It also receives the output of the pixel counter 353 which is on a ten bit bus.

In the case of the interlaced camera input, as indicated above, delay counter 301 generates a pulse DSYNC which is the line sync signal received at write control logic 368. In the case of sequential scan this sync will not be delayed to the same extent to permit inputting data as soon as the line starts. In either case, the write control logic, responsive to this signal and to the pixel count on line 369, will cause 512 pixels to be read into the buffer memory 370 for each line. In the case of the interlaced scan these are read in at the rate of 13 MHz and in the case of sequential scan at the rate of 10 MHz. (AIK memory is provided to allow expansion to 1024 lines of resolution)

The major portion of the remainder of the system operates at 8.33 MHz to permit operating continuously and at a rate within the capabilities of available hardware. The system clock is generated by 25 mHz crystal oscillator 380, the output of which is divided by 3 in a divide by 3 counter 381 to provide an 8.33 mHz system clock signal on line 379. This line along with the end of line and end of frame signals from detectors 355 and 357 are inputs to bus timing module 377. Bus timing logic outputs operate the read control logic 376 associated with the steering logic 367 and 375, the portion 375 being at the output of the buffer memories, to read out data on line 378. The reading out is done at the rate of 8.33 mHz. Read control logic 376 counts the number of pixels read out and provides the signal on line 379 as an input to bus timing 377. Basically, the data on line 378 is read out continuously at 8.3 mMHz. It is possible to read it out at this slower rate because of the continuous reading. The input takes place in bursts because of the retrace in the case of the 10 mMHz signal and the retrace and the accelerated inpu in the case of the 13 mMHz signal. The 10 data lines 378 are combined with 3 synchronization lines on a bus 382, these being time sync, frame sync and system clock, and provided as inputs to differential bus drivers 383 at least one of which is enabled by a bus enable signal 385 obtained from the control register 305.

The third and fourth selections comprise selections of the noninterlace RAM signal and the interlace RAM signal. These are signals used for test purposes. In the case of the noninterlace RAM, the sync signals are derived from the camera control logic 339. In the case of the interlace RAM operation, the sync signals are obtained from an RS-170 timing generator RAM 388. RS-170 is a standard television interlace scan. A 10 MHz oscillator 389 provides an output into a divide by 5 counter 390, which then provides a 2 mMHz addressing signal into the timing generator RAM 388. The RAM 388 in turn generates the field index, vertical drive and horizontal drive signals which are provided as inputs to the sync selector multiplexer 337 where they are selected and used in the output in the same manner as the sync signals from the digitizer of FIG. 4.

Through provision of a control signal on line 341, the 10 mMHz keyed oscillator is turned on and provides an input into the RAM control logic 331 which provides address bits 2–6 to a test pattern RAM 391. This provides 5 bits of an 8 bit address. Additional bits of the address are provided by a bit shift multiplexer 393 having as inputs the outputs of line counter 351. When in the interlace mode every other line is skipped. The selected RAM outputs are coupled through a serializer 394 and a checker board inverter made up of exclusive OR gates to provide the data output. The second input to exclusive OR gates is the 7th bit output of the RAM control logic. The RAM stores a 128×128 pixel patern. Thus, these patterns must alternate and are in a 4×4 matrix with adjacent patterns inverted by the checkerboard inverter.

In the case of non-interlaced operation, as indicated by the noninterlace control signal input to the multiplexer 393, every line in sucession is selected rather than every other line. In either case, the data finds its way to bus 396 and then through the multiplexer 325 after which it is treated in the manner described above. By having both the non-interlace and interlace capability with the test pattern, the ability of the system to operate with either type of input can, thus, be tested.

The final function of the digitizer interface is in the conversion of processed digital information back into analog form for display. As noted previously, this information appears on bus 364 and may, in some cases, be simply the input information bypassing all processing. In any case, an arrangement very much like that used in providing input data into the processor is used in outputing it to the display. The data is coupled into steering logic 401 which is under the control of write control logic 403. Similarly, the output steering logic 405 is controlled by the read-control logic 407. The reading and writing is done into and out of buffer memories 409 and 411 with, again, a page swap control 413 provided. Operation is essentially as described above in connection with the buffer memories 370 and 371.

A frame processor read control 421 which also has as an input the output of the 10 mMHz oscillator 389 provides outputs of line sync and frame sync to the display and interlace frame processors described above in connection with FIG. 2. Frame processor read control 421 performs functions somewhat analogous to the clock-control logic 339 in that it relies on an end-of-field detector 423 and an end-of-line detector 425 in developing its line sync and frame sync signals. The detectors in turn are fed from a line counter 427 and a pixel counter 429, respectively. The line counter counts line sync pulses from the frame processor read control 421. These line sync pulses are also used to enable the pixel counter. The pixel counter counts 10 mMHz pulses from the 10 mMHz oscillator when enabled. The timing generator RAM 388 also provides sync and blanking outputs to a block 431 which is a sync pulse to end-of-blanking delay counter similar to block 301. Here, a control word "Outcount" obtained from the address register 307 is utilized to establish the period between the sync pulse and end-of-blanking delay. This establishes the delay on the screen when going back into the 4-3 aspect ratio.

Another output of block 431, which is a 2-bit output, is provided as the two-most significant bit inputs to a digital-to-analog converter 433 which provides, on video cable 435 composite video. The data into the converter is provided on line 437 from steering logic 405. It is caused to convert at a rate of 13 mMHz in response to an output from a 13 m MHz clock 439, which also provides a clock input to the read control logic 407. Read control logic 407 also receives an output from the sync pulse to end-of-blanking delay counter 431, which effectively tells it when to start reading out. In other words, when the blanking delay is over, it is time to start outputting video information. In the interlace frame processors 123, the information was being processed at a 10 mMHz rate. Now, because of the 4:3 aspect ratio, the output must be read out at a 13 mMHz rate to establish the proper 4:3 aspect ratio. Thus, the write control logic receives as inputs the 10 bit output of pixel counter 429 which operates at the 10 mMHz rate, then uses this information along with line sync to carry out the writing of data into the buffer memories 409 and 411.

DIGITIZER INTERFACE SOFTWARE CONTROL

The host 29 output function code definitions that apply are outlined below:

| Function Codes | Device Address |
|---|---|
| 0 - Undefined | 5 |
| 1 - Read Back Zeros | |
| 2 - Undefined | |
| 3 - Output First Control Word | |
| 4 - Output Second Control Word | |
| 5 - Undefined | |
| 6 - Undefined | |
| 7 - Board Select | |

Before any data is transferred to the digitizer interface it must be selected via the board select function with the appropriate device address.

Control

The digitized interface (DI) 103 is controlled by 2 control words (4 bytes) referred to simply as "first control word" and "second control word." These are the words stored in register 305 and 307 described above. The functions controlled are as follows:

First Control Word:
(A) 8-bit value specifying the number of input pixels to be "ignored" by the digitizer at the start of each line. This value should only be used if the DI is in "camera" mode. It should be equal to 1 for a non-interlaced camera and 84 for an interlaced camera. (IN COUNT)

(B) 8-bit value indicating the number of 10 mMHz clock pulses to be "ignored" by the composite video generator (CVG) after the start of each line. This value is used to accomodate format and/or timing differences between the digital input and the video output. It is constant for any source/destination pair. (OUT COUNT)

These bytes are transferred to register 307.

Second Control Word:

(A) 1-bit "composite" switch indicating to the digitizer whether input is composite sync and video signals (interlaced or RS170) vs separate sync and video (non-interlaced or progressive scan).

(B) 1-bit "normal" switch selecting normal vs bypass mode. In "normal" mode the digitizer interface output is sent to bus 1. In "bypass" mode, the digitizer interface output is sent directly to the CVG. "Bypass" should only be used with the "interlace test" mode. (See below.)

(C) 1-bit "delay start" switch to enable the CVG to handle interlace data.

(D) 1-bit "interlace" switch indicating to DI whether or not input signal is interlaced.

(E) 2-bit "mode" selector allowing camera, external, or test modes of operation.

(F) 1-bit "bus 1 enable" switch output to bus 1.

(G) 4-bit 1's complement of value to be used as the "first field line delay counter" if "delay start" is enabled.

(H) 4-bit 1's complement of value to be used as the "last line delay counter" if "delay start" is enabled.

These bits are held in register 305.

Digitizer Interface First Control Word Format:

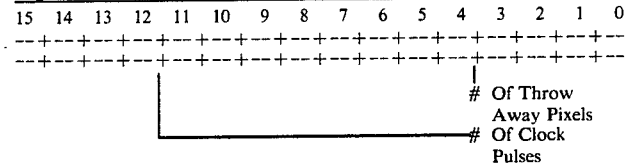

| Number of Throw Away Pixels | Bits 7 6 5 4 3 2 1 0 |
|---|---|
| 0 | 0 0 0 0 0 0 0 0 |
| . | . |
| . | . |
| 255 | 1 1 1 1 1 1 1 1 |
| Number Of Clock Pulses | Bits 15 14 13 12 11 10 9 8 |
| 0 | 0 0 0 0 0 0 0 0 |
| . | |
| . | |
| 255 | 1 1 1 1 1 1 1 1 |

Digitizer Interface Second Control Word Format:

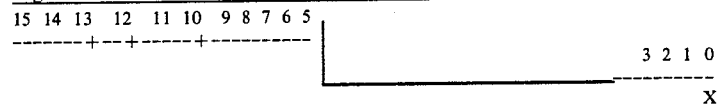

| | Bit | | |
|---|---|---|---|
| Composite | 1 | | |
| Separate Video And Sync | 0 | | |
| Composite Video And Sync | 1 | | |
| Norm/Bypass Into CVG | Bit 2 | Delay Start | Bit 3 |
| By-pass (Test) | 0 | Disable | 0 |
| Normal | 1 | Enable | 1 |
| Non-Interlace Mode | Bit 4 | Operation Mode | Bits 7 6 |
| Interlaced | 0 | Non-int. Test | 0 0 |
| Non-interlaced | 1 | Camera | 1 0 |
| | | External | 0 1 |

-continued

|  | Bit |
|---|---|
| Interlace Test | 1  1 |
| Bus 1 Enable | 5 |
| Disable | 0 |
| Enable | 1 |

| 1st Field Line Delay Counter | Bits 11 | 10 | 9 | 8 | Last Field Line Delay Counter | Bits 15 | 14 | 13 | 12 |
|---|---|---|---|---|---|---|---|---|---|
| 15 | 0 | 0 | 0 | 0 | 15 | 0 | 0 | 0 | 0 |
| 14 | 0 | 0 | 0 | 1 | 14 | 0 | 0 | 0 | 1 |
| 13 | 0 | 0 | 1 | 0 | 13 | 0 | 0 | 1 | 0 |
| 12 | 0 | 0 | 1 | 1 | 12 | 0 | 0 | 1 | 1 |
| 11 | 0 | 1 | 0 | 0 | 11 | 0 | 1 | 0 | 0 |
| 10 | 0 | 1 | 0 | 1 | 10 | 0 | 1 | 0 | 1 |
| 9 | 0 | 1 | 1 | 0 | 9 | 0 | 1 | 1 | 0 |
| 8 | 0 | 1 | 1 | 1 | 8 | 0 | 1 | 1 | 1 |
| 7 | 1 | 0 | 0 | 0 | 7 | 1 | 0 | 0 | 0 |
| 6 | 1 | 0 | 0 | 1 | 6 | 1 | 0 | 0 | 1 |
| 5 | 1 | 0 | 1 | 0 | 5 | 1 | 0 | 1 | 0 |
| 4 | 1 | 0 | 1 | 1 | 4 | 1 | 0 | 1 | 1 |
| 3 | 1 | 1 | 0 | 0 | 3 | 1 | 1 | 0 | 0 |
| Not Used | 1 | 1 | 0 | 1 | Not Used | 1 | 1 | 0 | 1 |
| Not Used | 1 | 1 | 1 | 0 | Not Used | 1 | 1 | 1 | 0 |
| Not Used | 1 | 1 | 1 | 1 | Not Used | 1 | 1 | 1 | 1 |

THE FRAME PROCESSOR

Figure 6:
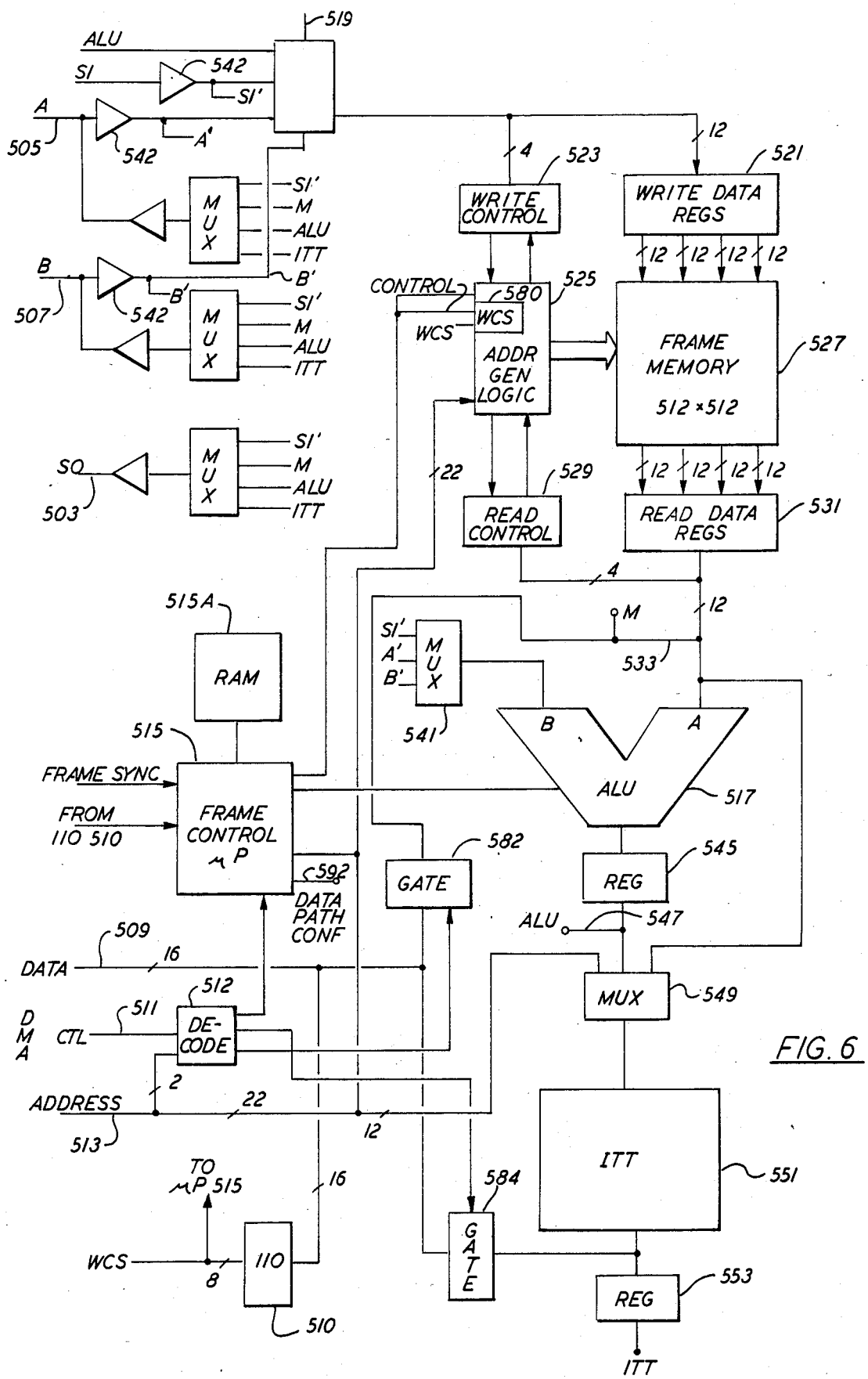
FIG. 6 is a block diagram of the frame processor of the present invention.

The frame processor has associated with it four buses as described above in connection with FIG. 1 and illustrated by FIG. 6. There is a system input (SI) bus 501 and a system output (SO) bus 503, and bidirectional buses designated 505 and 507, known as the "A" and "B" busses. Each of the buses is a 16 bit bus with 12 bits for data and 4 bits for control (sync signals). The frame processors also have a direct memory access bus 504 with 16 bits of data 8 bits of control on bus 511 and a 24 bits of address on bus 513. Data bus 509 is coupled into a frame control microprocessor 515, through an 1I0 module 510 described below, a separate processor being provided for each of the frame processors in the system. Control bus 511 is coupled through a decoder block 512 to processor 515. Outputs from decoder 512 labeled "ITT Access and RAM Access" are also provided. Tne oututs indicate where incoming data is directed.

The buses 501, 505 and 507 are coupled as inputs to a multiplexer 516 along with an input designated ALU which is the output of an arithmetic and logic unit 517 to be discussed in more detail below. One of these outputs is selected in accordance with a control signal, developed in processor 515, on line 519 into the multiplexer. (Each multiplexer in the frame processor has similar control lines. For most of the remaining multiplexers these are not shown for sake of simplicity.) The 12 data bits of the multiplexer are provided to write data registers 521 and the 4 control bits to write control logic 523. The write control logic cooperates with address generation logic 525 to control the operation of the write data registers. Information from the write data registers is transferred into a frame memory 527. The manner in which this data transfer is carried out is described in detail in U.S. application Ser. No. 568,025, entitled Digital Frame Processor Pipe Line circuit, filed on even date, herewith and assigned to the same assignee as the present invention.

Similarly, read control logic 529 operates to control the read data registers 531 in conjunction with address generate logic 529. The output from the frame memory data registers 531 is designated with the letter M on bus 533. This may be provided as a final output of the system on the A, B or SO bus through one of associated respective multiplexers 535, 537 or 539. However, it can also be provided as the A input to the ALU 517 in which an arithmetic or logic operation will be carried out on it. In particularly, it is possible for it to be involved in an operation with another piece of data provided to the B input. The B input is obtained from a multiplexer 541 having as inputs the buses SI', A' and B', these, respectively, corresponding to the SI bus, A bus and B bus after being coupled through a driver 542. The ALU 517 is controlled in its function over a line or bus 543 from the control processor 515. The output of the ALU is stored in a register 545 from which the signal designated ALU on line 547 may be taken off and provided as one of the outputs through one of the multiplexers 535, 537 and 539.

In addition, either the signal on line 533, ALU signal on line 547 or input from a multiplexer 541 can be selected by a mutliplexer 549 and coupled through a image intensity transformation block 551, this comprising a memory in which the data coupled through the multiplexer 544 is used as address information to select a transformation function at the stored location. This output designated ITT data is then coupled into a register 553, the output of which is a further input to each of the multiplexers 535, 537 and 539.

The incoming data direct access bus data portion 509 is coupled through an I/0 module 510. Here, the 16 bits of data on the data bus are broken down into two 8 bit words. The output of the 1/0 module 510 can be coupled either to the microprocessor 515 or to a unit 580 labeled WCS indicated as being associated with the address generate logic. WCS 580 is adapted to store a plurality of commands from the direct access bus until they can be used by the processor. Twelve lines of the data bus are also coupled through dated drivers 582 and 584 respectively to the output on line 553 from the frame memory, and the data input/output of the image transformation memory 551.

The address bus associated with the direct access bus is coupled into the processor, 515, the address generate logic and also coupled to the multiplexer 512. The control bus 511 coupled through a decoder 586 selects, in conjunction with inputs from the address bus 513, the microprocessor, ITT access or frame memory access. With this arrangement, information on the direct memory acoess bus can be loaded into the frame control microprocessor. In addition, there is direct access to the frame memory and to the image transformation memory. This permits the host to look at the frame memory 527 and extract therefrom any pixel or group of pixels under its own address control. The corresponding output on line 533 is fed back over the data bus 508. In addition, the image transformation function stored in the image transformation memory can be adjusted from the host computer. In this case, the host computer addresses the particular memory location and then by means of the data bus loads into that location the desired transformation value. This permits using different transformation constants for different purposes and adjusting them as necessary.

Also microprocessor 515 is an output designated data path configure on line 592. Tnis line, or particular parts of it are the inputs to the various multiplexers described previously and provide the control signals into those multiplexers to select the particular input or output desired.

Although the present system is adapted to operate on a 512 by 512 matrix, the system is adapted for expansion to higher resolution of a 1,000 or 2,000 lines.

Figure 7:
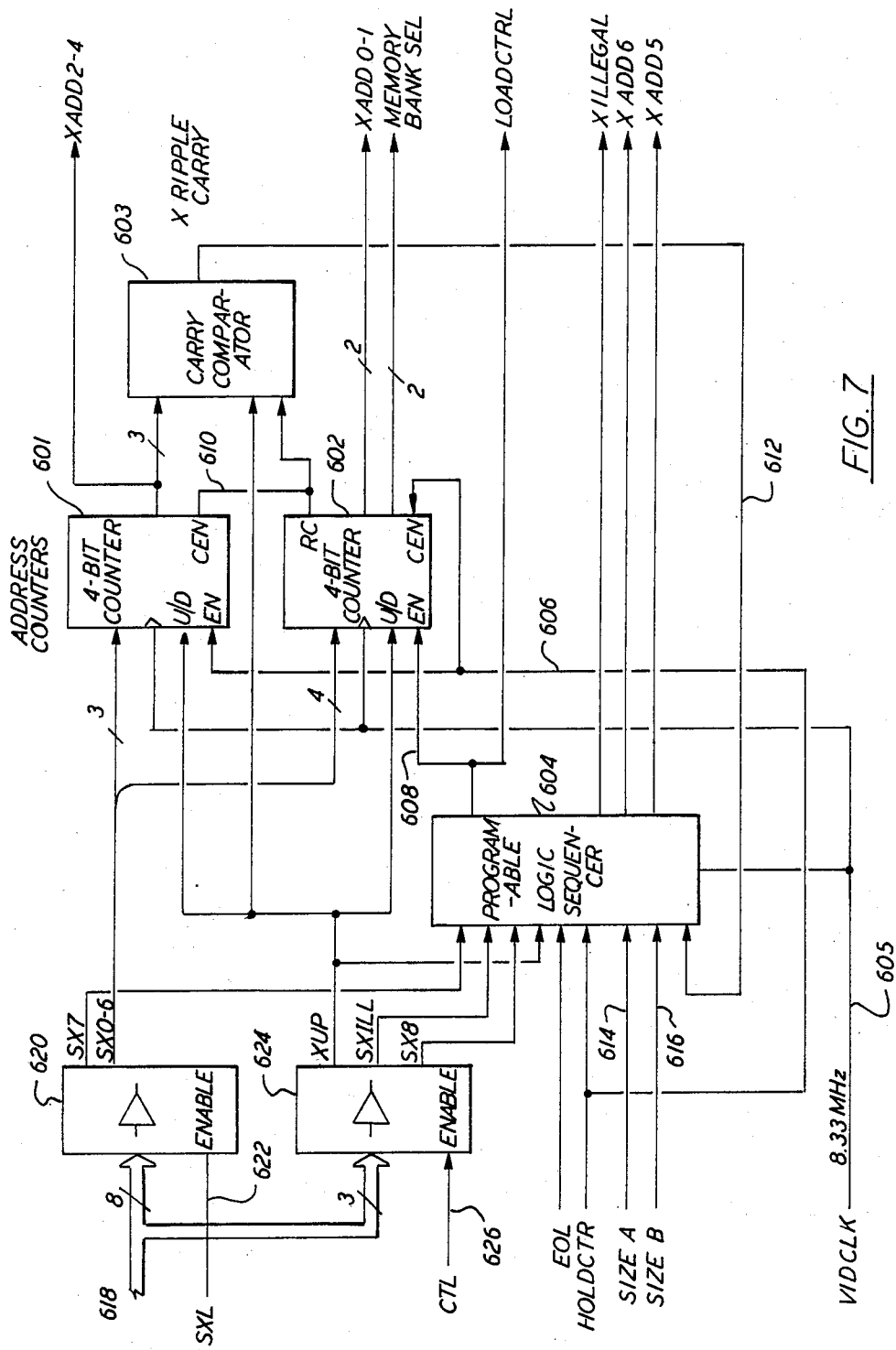
FIG. 7 is a block diagram illustrating in more detail some of the address logic of the frame processor of FIG. 6.

FIG. 7 is a block diagram of the X address generation hardware which permits this flexibility. This circuit utilizes two four bit counters 601 and 602 along with a carry comparator 603 and a programmable logic sequencer 604 to give the necessary flexibility. The clock signal on line 605 is provided as inputs to the count input of the two counters. The counters each have an input for presetting the counter and an up-down input along with chip enable and enable inputs. The use of these inputs will be explained below. The counter 602 provides four output lines. The first two of these output lines select a memory bank. The frame memory 527 of FIG. 6 is divided into four banks of memory. In order to operate at the necessary speed, as explained in co-pending application Ser. No. 586,025 these memory banks are addressed in succession and thus the least significant 2 bits of the address select the memory bank. Counter 602 also provides the first 2 bits (0 and 1) of the X address in each individual memory bank. Counter 601 provides the X address bits 2, 3 and 4. The programmable logic sequencer 604 provides the X address bits 5 and 6 along with an indication of an illegal address bit. Bit 5 of the address bit is, in effect, the 8th bit and corresponds to a value of 256. Thus, when all of the bits through the 8th bit have a value of 1 the count is 511. Since the first pixel is at 0 this is the 512th pixel. Thus, the bits through the X address bit 5, are required to address 512 pixels. Adding X address the bit 6 permits addressing 1,024 pixels and by using the final bit "X illegal" which normally indicates an illegal count, it is possible to address 2048 pixels.

In operation, the chip of counter 602 is enabled by a signal designated "HOLDCTR" and counting enabled by an output from the programmable logic sequencer 604 generated in response to the end of line signal "EOL." The counter 602, when enabled, begins counting clock pulses and generating, in succession, memory addresses with the first 2 bits selecting the memory bank and the third and fourth bits selecting locations within each of the memory banks. When the counter generates a carry signal on line 610, this becomes a chip enable signal for counter 601 which also has its count enable input enabled by the signal on line 606. Thus, the counter 601 is now enabled to count and provide the next three bits of the address. The carry output of counter 602 and the three output lines of counter 601 are provided into a carry comparator 603 which contains logic to detect when a count of 256 is reached. At that point it generates a ripple carry on line 612 which is an input to the programmable logic sequencer 604. The programmable logic sequencer 604 has inputs on lines 614 and 616 designated "Size A" and "Size B". It is programmed so that, with a size A input in response to the ripple carry it will generate the X address bit 5 output and on the next ripple carry will generate an "X illegal" output. If size B is selected then it will count up to 1024 before generating the illegal count. By providing signals on both size A and size B lines, the illegal count can be converted into a third bit output having a bit value of 1024 to permit addressing 2048 lines. The illustrated logic also permits presetting the counter in a convenient manner to generate an X offset and allows counting up or down. Offset is important since it is used in matching images, i.e., a mask image and a medium image and the ability to do so quickly and efficiently is important if matching is to be attempted in real time. On a bus 618, data concerning the starting address is provided. Eignt bits are provided into line drivers in block 620 enabled by an input on line 622. The first 7 bits, designated SX0-6, are provided as pre-set inputs to counters 602 and 601. The 8th bit is an input to the programmable logic sequencers 604. Three lines are provided as inputs to another line driver 624 enabled by a line 626. These are the signals "XUP" "SXILL" and "SX8" (the 9th bit). "SXILL" can be utilized as the 10th bit in case of addressing 2048. The "XUP" up signal controls whether counting is up or down and is provided as an input to the counters 601 and 602 into the carry comparator 603. With this arrangement, the counters and programmable logic sequencer can be preloaded for example with the address 511 and counting down to address 0 carried out to operate in reverse order. In terms of offset, an offset of anywhere from 1 to 511 bits can be provided. Through the use of the programmable logic sequencer 604, the number of hardware elements necessary to implement all these functions is considerably reduced.

SOFTWARE CONTROL OF THE FRAME PROCESSORS

Each frame processor has been assigned a mnemonic and serves a specific purpose as shown below:

"NI" (111)—Performs interlace to non-interlace conversion of camera data.

"ALU1" (113)—Performs ALU operations on frame data and is used for frame data transfers to and from LSI-11.

"ALU2" (117)—Performs ALU operations on frame data and is used for frame data transfers to and from LSI-11.

"DF" (122)—Performs ALU operations in degraded mode and is used for frame data transfers to and from LSI-11.

"I1" (123)—Performs interlace staging.

"I2" (125)—Performs non-interlace to interlace conversion of frame data.

Certain function code definitions for commands from the host apply for all frame processors and frame processor device addresses are outlines as follows:

| DRV11B Function Codes | Device Addresses |
|---|---|
| 0 - Write Data | NI - 7 |
| 1 - Read Data | ALU1 - 11 |
| 2 - Undefined | ALU1 - 13 |
| 3 - Write Address | DF - 17 |
| 4 - Send Control | I1 - 19 |
| 5 - Read Control | I1 - 21 |
| 6 - Undefined | Global - 63 |
| 7 - Board Select | |

Before any data is transferred to or from a frame processor, it must be selected via the board select function with the appropriate device address. The global device address can be used in conjunction with the board select function in which case subsequent data transfers will apply all frame processors.

Macros

A frame processor macro is a collection of elements (described in detail below). Combined, these macro elements completely specify the configuration for a frame processor. A required configuration for a frame processor is accomplished by execution of a defined macro over a number of frames. A macro may execute finitely over from 1 to 255 frames or infinitely.

Macro Elements

A macro element is a control word that is sent to a frame processor as part of a define-macro sequence. When received by a frame processor, a macro element is stored in the storage RAM 515A as part of the macro being defined. Macro elements do not directly affect the frame buffer configuration but, rather, are used by the micro-controller 515 to configurations the frame processor when the macro is executed.

Macro-Set

A macro-set is a collection of macros with corresponding frame counts. A frame processor contains exactly one macro-set which is stored in the storage RAM 515A. The macro-set is defined with "execute macro" commands and is executed with "go" command. Execution of a macro-set is the only way in which the micro-controller configures the frame buffer for real-time operation.

Macro Element Definitions:
Name: Bus Configuration (BC)
Control Word Format:

```
15 14 13 12 11 10 9 8 7 6 5 4 3 2 1 0
--+--+--+--+--+--+-+-+-+-+-----+-----+-
 1  0  0  0  0  0 0 0
--+--+--+--+--+--+-+-+-+-+-----+-----+-
```
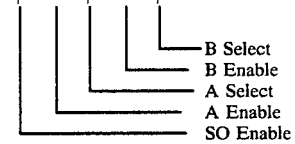
- B Select
- B Enable
- A Select
- A Enable
- SO Enable

| "B Select" B Bus Source | Bits 1 0 | "B Enable" Output to Bus | Bit 2 |
|---|---|---|---|
| SI Bus (501) | 0 0 | Disabled | 0 |
| Memory | 0 1 | Enabled | 1 |
| ALU | 1 0 | | |
| ITT | 1 1 | | |

| "A Select" A Bus Source | Bits 4 3 | "A Enable" Output to Bus | Bit 5 |
|---|---|---|---|
| SI Bus | 0 0 | Disabled | 0 |
| Memory | 0 1 | Enabled | 1 |
| ALU | 1 0 | | |
| ITT | 1 1 | | |

| "SO Select" SO Bus Source | Bits 7 6 |
|---|---|
| SI Bus | 0 0 |
| Memory | 0 1 |
| ALU | 1 0 |
| ITT | 1 1 |

Name: ALU/ITT Control (AICTL)

```
15 14 13 12 11 10 9 8 7 6 5 4 3 2 1 0
--+--+--+--+--+--+-+-+-+-+-----+-----+-
 1  0  0  0  1  0 0 0
--+--+--+--+--+--+-+-+-+-+-----+-----+-
```
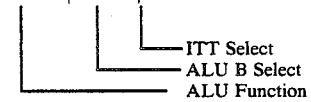
- ITT Select
- ALU B Select
- ALU Function

| ITT Input | Bits 1 0 | ALU Function | Bits 7 6 5 4 |
|---|---|---|---|
| Memory | 0 0 | Clear (ALU=0) | X 0 0 0 |
| ALU | 0 1 | B − MEM − 1 | 0 0 0 1 |
| ALU Input | 1 0 | MEM − B − 1 | 0 0 1 0 |

-continued

| | | | | | | | | |
|---|---|---|---|---|---|---|---|---|
| Disable ITT | 1 | 1 | MEM + B | 0 | 0 | 1 | 1 | |
| | | | MEM XOR B | X | 1 | 0 | 0 | |
| | | | MEM OR B | X | 1 | 0 | 1 | |
| ALU B/ITT | Bits | | MEM AND B | X | 1 | 1 | 0 | |
| Input | 3 | 2 | Preset (ALU=1) | 0 | 1 | 1 | 1 | |
| | | | B − MEM | 1 | 0 | 0 | 1 | |
| SI Bus | 0 | 0 | MEM − B | 1 | 0 | 1 | 0 | |
| A Bus | 0 | 1 | MEM + B + 1 | 1 | 0 | 1 | 1 | |
| B Bus | 1 | 0 | Disable ALU | 1 | 1 | 1 | 1 | |
| "Constant" | 1 | 1 | | | | | | |
| | | | "X" denotes don't care. | | | | | |

ALU A-input is always memory. ALU B-input is selectable as SI bus, A bus, B, bus, or "constant." "Contant" is 4095 (FF HEX).

The frame processor ALU synchronizes its inputs.

lock-up of the frame processor. If the ALU function is "disabled" this problem is avoided.

The ALU operates on unsigned numbers. It saturates to all zeros on underflow and all ones on overflow.

Name: Frame Memory Control (FMC)
Control Word Format:

```
15  14  13  12  11  10  9   8   7   6  5  4  3 2 1 0
--+---+---+---+---+---+---+---+---+-+-+-+-+-----+-----+-
 1   0   0   1   0   0   0   0
--+---+---+---+---+---+---+---+---+-+-+-+-+-----+-----+-
```

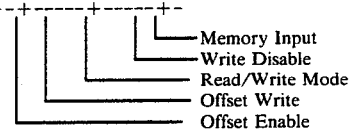
Memory Input
Write Disable
Read/Write Mode
Offset Write
Offset Enable

| Memory Input Source | Bits 1 | 0 | Memory Write Disable | Bits 2 |
|---|---|---|---|---|
| SI Bus (501) | 0 | 0 | Write Enabled | 0 |
| A Bus (505) | 0 | 1 | Write Disabled | 1 |
| B Bus (507) | 1 | 0 | | |
| ALU (527) | 1 | 1 | | |

| Memory Read/Write Mode | Bits 5 | 4 | 3 | Read/Write Offset | Bit 6 |
|---|---|---|---|---|---|
| Independent | 0 | 0 | 0 | Read | 0 |
| Read 1st, line | 0 | 0 | 1 | Write | 1 |
| Write 1st, line | 0 | 1 | 0 | | |
| Unsued | 0 | 1 | 1 | | |
| Read Disable | 1 | 0 | 0 | | |
| Read 1st, frame | 1 | 0 | 1 | | Bit |
| Write 1st, frame | 1 | 1 | 0 | Offset Enable | 7 |
| Read Synch. Indep. | 1 | 1 | 1 | No | 0 |
| | | | | Yes | 1 |

| | |
|---|---|
| Independent | — There is no inter-dependence between memory reads and memory writes. |
| Read 1st, line | — On a line-by-line basis, the write of a line is "held off" until that line has been read. |
| Write 1st, line | — On a line-by-line basis, the read of a line is "held off" until that line has been written. |
| Read Disabled | — Memory read is disabled. |
| Read 1st, frame | — On a frame-by-frame basis, the write of a frame is "held off" until that frame has been read. |
| Write 1st, frame | — On a frame-by-frame basis, the read of a frame is "held off" until that frame has been written. |
| Read Synchronized | — Memory read and memory write are based on independent asynchronous clocks. There is no interdependence between memory reads and memory writes. |

Since the A-input is always memory, it will normally "hold off" B-input until it has memory data. Depending on the memory read-write mode this could result in a The following is a breakdown of which read/write mode are used in various frame processors for specific operations and functionality.

| Read/Write Mode | Frame Processor | Cases |
|---|---|---|
| Independent | ALU1, ALU2, DF | ALU Accumulate Pass Through |
| Read 1st, line | ALU1, ALU2 | ALU Operations Except accumulate |
| Write 1st, line | None | None |

-continued

| | | |
|---|---|---|
| Read Disable | ALU1, ALU1, DF | Default, Emergency, or degraded, mode; when Bypassing A F. P. |
| Read 1st. frame | None | None |
| Write 1st. frame | 11 | Always except for when recording data on WBTR |
| Read Synchronized | NI | Always when recording data on WBTR |

Name: <u>Coordinate Transformation Control (CTC)</u>
Control Word Format:

```
15  14  13  12  11  10  9  8  7  6  5  4  3  2  1  0
--+--+--+--+--+--+-+-+-+-+-----+-----+-
 1   0   0    1   1   0   0   0
--+--+--+--+--+--+-+-+-+-+-----+-----+-
                         │ │ │ │ │      └─X Read
                         │ │ │ │ └────────Y Read
                         │ │ │ └──────────X Write
                         │ │ └────────────Y Write
                         │ └──────────────Read Zoom Factor
                         └────────────────Write Mooz Factor
```

| | Bit | | Bit |
|---|---|---|---|
| X Read | 0 | Y Read | 1 |
| Increment | 0 | Increment | 0 |
| Decrement | 1 | Decrement | 1 |

| | Bit | | Bit |
|---|---|---|---|
| X Write | 2 | Y Write | 3 |
| Increment | 0 | Increment | 0 |
| Decrement | 1 | Decrement | 1 |

| Read Zoom Factor | Bits | | Write Mooz Factor | Bits | |
|---|---|---|---|---|---|
| | 5 | 4 | | 7 | 6 |
| No Zoom | 0 | 0 | No Mooz | 0 | 0 |
| TBD 1 | 0 | 1 | TBD 1 | 0 | 1 |
| TBD 2 | 1 | 0 | TBD 2 | 1 | 0 |
| TBD 3 | 1 | 1 | TBD 3 | 1 | 1 |

Note:
(1) X/Y read/write affects the orientation of a frame as it is read/written from/to a frame processor.
(2) Read Zoom factor causes individual pixels to be repeated in an NXN pattern as the frame is read out of a frame processor.
(3) Write Mooz factor causes N:1 decimation to occur as a frame is written into a frame processor.

The following is a breakdown of which read/write mode are used in various frame processors for specific operations and functionality.

Name: Set X Offset (SXO)
Control Word Format:

```
15  14  13  12  11  10  9  8  7  6  5  4  3  2  1  0
--+--+--+--+--+--+--+--+-+-+---+-+-+--+
 1   0   1   0   0
--+--+--+--+--+--+--+--+-+-+---+-+-+--+
```

| Two's Complement Offset | Bits 10 9 8 7 6 5 4 3 2 1 0 |
|---|---|
| X Offset Of 0 | 0 0 0 0 0 0 0 0 0 0 0 |
| X Offset Of 1 | 0 0 0 0 0 0 0 0 0 0 1 |
| X Offset Of 1023 | 0 1 1 1 1 1 1 1 1 1 1 |
| X Offset Of −1024 | 1 0 0 0 0 0 0 0 0 0 0 |
| X Offset Of −1023 | 1 0 0 0 0 0 0 0 0 0 1 |
| X Offset Of −1 | 1 1 1 1 1 1 1 1 1 1 1 |

This function does not change frame memory contents but does affect how frame memory is read (i.e., next downstream FP will have the shifted frame in one frame time).

Name: Set Y Offset (SYO)
Control Word Format:

```
15  14  13  12  11  10  9  8  7  6  5  4  3  2  1  0
--+--+--+--+--+--+-+-+-+-+-+-+-+-+-+-
 1   0   1   1   0
--+--+--+--+--+--+-+-+-+-+-+-+-+-+-+-
```

| Two's Complement Offset | Bits 10 9 8 7 6 5 4 3 2 1 0 |
|---|---|
| Y Offset Of 0 | 0 0 0 0 0 0 0 0 0 0 0 |
| Y Offset Of 1 | 0 0 0 0 0 0 0 0 0 0 1 |
| Y Offset Of 1023 | 0 1 1 1 1 1 1 1 1 1 1 |
| Y Offset Of −1024 | 1 0 0 0 0 0 0 0 0 0 0 |
| Y Offset Of −1023 | 1 0 0 0 0 0 0 0 0 0 1 |
| Y Offset Of −1 | 1 1 1 1 1 1 1 1 1 1 1 |

This functions does not change frame memory contents but does affect how frame memory is read (i.e., next downstream FP will have the shifted frame in one frame time).

Frame Processor Command

A Frame processor command is a control word that can be sent locally to a single frame processor globally to all frame processor(s). They differ from macro definition elements in that the must be sent directly to the frame processor(s) and may not be sent as a part of a macro definition. Frame processor commands and corresponding control word format are described individually below:

Command Name: Reset

Bus configuration is reset. Frame processor is removed from all buses. Frame memory read/write is disabled. Causes "macro set" pointer to be reset. Executes after next frame.

```
Control Word Format:
15 14 13 12 11 10 9 8 7 6 5 4 3 2 1 0
 0  0  0  0  0  0 0 0 0 X X X X X X X
```
X—Don't Care

Command Name: Stop

Frame memory is write disabled. Memory read and output bus configuration are not affected. Causes "macro set" pointer to be reset. Executes after next frame sync.

```
Control Word Format:
15 14 13 12 11 10 9 8 7 6 5 4 3 2 1 0
 0  0  0  0  0  0 0 1 X X X X X X X X
```
X—Don't Care

Command Name: Freeze

Causes the input bus to be held off. Frame memory is write disabled. Memory read and output bus configuration are not affected. Cause "macro set" pointer to be reset. Executes after next frame sync.

```
Control Word Format:
15 14 13 12 11 10 9 8 7 6 5 4 3 2 1 0
 0  0  0  0  0  0 1 0 X X X X X X X X
```
X—Don't Care

Command Name: Set Interlace Mode

Commands the frame processor to perform/not perform interlace conversion for input/output interlace data. This command should be sent to all frame processors as part of system initialization. This command is ignored if it is sent during the real-time frame buffer control (i.e., it is only implemented if the micro-controller is in "idle" mode).

```
Control Word Format:
15 14 13 12 11 10 9 8 7 6 5 4 3 2 1 0
 0  0  0  0  0  1 0 0 X X X X X
                                └── convert
                                    enable
                                └── in/out
```

X — Don't Care

| Convert Enable | Bit 0 |
|---|---|
| Disable | 0 |
| Enable | 1 |

| In/Out | Bit 1 |
|---|---|
| Convert non-interlaced memory to interlaced output (Used with "read sync" mode) | 0 |
| Convert interlaced input to non-interlaced output (Used with "write 1st, frame" mode) | 1 |

Command Name: Select Memory

Selects frame/ITT memory for subsequent read/write data DMA transfers. Use this command to ensure that the data will be transferred from/to the intended source/destination. Executes immediately (no wait for frame sync).

```
Control Word Format:
15 14 13 12 11 10 9 8 7 6 5 4 3 2 1 0
 0  0  0  0  0  1 0 1 X X X X X X X
                                    └── ITT Select
```

X — Don't Care
ITT Select 0

| Frame Memory | 0 |
|---|---|
| ITT | 1 |

Command Name: Shift Image

Causes one pixel shift in the data stream as the frame is read in the +/−X/Y direction. Executes immediately (no wait for frame sync).

Control Word Format:

```
15 14 13 12 11 10  9  8  7  6  5  4  3  2  1  0
 0  0  0  0  1  0  0  0  X  X  X  X  X  X
                                    └─ Shift Direction
```

X — Don't Care

| Shift Direction | Bits 1 | 0 |
|---|---|---|
| X | 0 | 0 |
| −X | 0 | 1 |
| X | 0 | 0 |
| −X | 0 | 1 |
| Y | 1 | 0 |
| Y | 1 | 0 |
| −Y | 1 | 1 |

Command Name: Home Image

Zeros out frame shift caused by "shift image" command in X and/or Y direction. Executes immediately (no wait for frame sync).

Control Word Format:

```
15 14 13 12 11 10  9  8  7  6  5  4  3  2  1  0
 0  0  0  0  1  0  0  1  X  X  X  X  X
                                 │  └─ X Home
                                 └──── Y Home
```

X — Don't Care

| X Home | Bit 0 | Y Home | Bit 0 |
|---|---|---|---|
| No | 0 | No | 0 |
| Yes | 1 | Yes | 1 |

Command Name: Go

Causes the "macro set" (see execute-macro command) for the addressed frame processor(s) to be executed a specified number of times. Execution begins after next frame sync. Once the execution begins, each macro in the "macro set" is executed for its respective number of frames.

Command Name: Define-Macro

Control Word Format:

```
15 14 13 12 11 10  9  8  7  6  5  4  3  2  1  0
 0  0  1  0  0  0  0  0
                              └─ Repeat Count
```

| Repeat Count | Bits 7 | 6 | 5 | 4 | 3 | 2 | 1 | 0 |
|---|---|---|---|---|---|---|---|---|
| Repeat Infinitely | 0 | 0 | 0 | 0 | 0 | 0 | 0 | 0 |
| Repeat 1 Time | 0 | 0 | 0 | 0 | 0 | 0 | 0 | 1 |
| Repeat 255 Times | 1 | 1 | 1 | 1 | 1 | 1 | 1 | 1 |

Causes succeeding macro elements to be stored as macro #N. A macro can executed at any time once it is defined. This command would normally be followed by the 6 macro elements.

Control Word Format:

```
15 14 13 12 11 10  9  8  7  6  5  4  3  2  1  0
 0  1  0              X  X  X  X  X  X  X  X
              └─ Macro #
```

X — Don't Care

| Macro Number | Bits 12 | 11 | 10 | 9 | 8 |
|---|---|---|---|---|---|
| Defined Macro #0 | 0 | 0 | 0 | 0 | 0 |
| Defined Macro #1 | 0 | 0 | 0 | 0 | 1 |
| Defined Macro #31 | 1 | 1 | 1 | 1 | 1 |

Command Name: Execute-Macro

Adds a macro with a frame count to a list in the addressed frame process(s). The list is referred to as a "macro set". This "macro set" is executed by the frame processor(s) when the next "go" command is received. A "macro set" can contain up to 16 macro/frame count pairs. A stop, reset, or freeze command resets the pointer into the "macro set" list.

```
Control Word Format:
15 14 13 12 11 10 9 8 7 6 5 4 3 2 1 0
--+--+--+--+--+--+-+-+-+-+-+-+-+-+-+-
 0  1  1
--+--+--+--+--+--+-+-+-+-+-+-+-+-+-+-
                   |             |
                   |             +---- Number of
                   |                   Frames
                   +---- Macro number
```

| Frame Execute Count | Bits |   |   |   |   |   |   |   |
|---|---|---|---|---|---|---|---|---|
|  | 0 | 1 | 2 | 3 | 4 | 5 | 6 | 7 |
| Execute Infinitely | 0 | 0 | 0 | 0 | 0 | 0 | 0 | 0 |
| Execute for 1 frame | 1 | 0 | 0 | 0 | 0 | 0 | 0 | 0 |
| Execute for 255 frames | 1 | 1 | 1 | 1 | 1 | 1 | 1 | 1 |

| Macro Number | Bits |   |   |   |   |
|---|---|---|---|---|---|
|  | 12 | 11 | 10 | 9 | 8 |
| Define Macro #0 | 0 | 0 | 0 | 0 | 0 |
| Define Macro #1 | 0 | 0 | 0 | 0 | 1 |
| Define Macro #31 | 1 | 1 | 1 | 1 | 1 |

WIDE BAND TAPE RECORDER INTERFACE COMPUTER CONTROL

The wide band tape recorder interface provides computer control over wide band tape recorder operations.

Function code definitions that apply for the wide band tape recorder interface and its device address are outlined below:

| DRV11B Function Codes (DMA) | Device Address |
|---|---|
| 0 - Undefined | 3 |
| 1 - Read WBTR Header RAM |  |
| 2 - Undefined |  |
| 3 - Write WBTR Header RAM |  |
| 4 - Write Command |  |
| 5 - Read Status |  |
| 6 - Write Configuration |  |
| 7 - Board Select |  |

Before any data is transferred to the wide band tape recorder interface it must be selected via the board selected function with the appropriate device address.

```
Wide Band Tape Interface Command Word Format:
15 14 13 12 11 10 9 8 7 6 5 4 3 2 1 0
--+--+--+--+--+--+--+-+-+-+-+-----+-----+-
                  X  X X X
--+--+--+--+--+--+--+-+-+-+-+-----+-----+-
                          | | | |       |
                          | | | |       +-- Direction Control
                          | | | +---------- Playback Mode
                          | | +------------ Reset Frame Count
                          | +-------------- Command
                          +---------------- Input Bus Select
                                            Fast
                                            Tape Speed
```

X — Don't Care

| Direction Control | Bit 0 | Command | Bits 4 3 | Playback Mode | Bit 1 | Reset Frame Count | Bit 2 |
|---|---|---|---|---|---|---|---|
| Forward | 0 | Stop | 0 0 | Free Run | 0 | No | 0 |
| Reverse | 1 | Undefined | 0 1 | Stop on Match | 1 | Yes | 1 |
|  |  | Play N Frames | 1 0 |  |  |  |  |
|  |  | Record N Frames | 1 1 |  |  |  |  |

|  |  | Data Rate | Bits 15 | 14 | 13 | 12 | 11 |
|---|---|---|---|---|---|---|---|
| Input Bus Select | Bit 5 | Undefined | 0 | 0 | 0 | 0 | 0 |
|  |  | 1 FPS | 0 | 0 | 0 | 0 | 1 |
|  |  | 2 FPS | 0 | 0 | 0 | 1 | 0 |
| A Bus | 0 | 3 FPS | 0 | 0 | 0 | 1 | 1 |
| B Bus | 1 | 4 FPS | 0 | 0 | 1 | 0 | 1 |
|  |  | 5 FPS | 0 | 0 | 1 | 0 | 1 |
| Fast | Bit 6 | 6 FPS | 0 | 0 | 1 | 1 | 0 |
|  |  | 7.5 FPS | 0 | 1 | 0 | 0 | 1 |
|  |  | Undefined | 0 | 1 | 0 | 0 | 0 |
| Normal | 0 |  |  |  |  |  |  |
| Fast | 1 | 12.5 FPS | 0 | 1 | 1 | 0 | 0 |
|  |  | Undefined | 0 | 1 | 1 | 0 | 1 |
|  |  | 30 FPS | 1 | 1 | 1 | 1 | 0 |
|  |  | Last Value | 1 | 1 | 1 | 1 | 1 |

WBTR Interface Command Word Field Descriptions:

Direction Control — Indicates direction of travel for commands that cause the wide band tape to move. Meaningful for record and playback commands.

Playback Mode — Meaningful for playback command only.

Free Run: For playback command the WBTR will playback the requested number of frames.

Stop On Match: WBTR will continue playback until a header data match occurs between RAM header and frame -continued

| | |
|---|---|
| | header on tape or the tape supply has been exhausted. |
| Reset Frame Court — | Meaningful for record command only. |
| | No: Continue to increment frame count. |
| | Yes: Frame count reset for first frame. |
| Command — | Controls movement of WBTR. |
| | Stop: Causes WBTR to come to a halt. |
| Play N Frames: | Requires a second command word. Causes WBTR to playback number of frames specified in the second command word; a value of 0 will causes the WBTR to playback until commanded to stop. |
| Record N Frames: | Requires a second command word. Causes WBTR to record number of frames specified in the second command word; a value of 0 will cause the WBTR to record until commanded to stop. |
| Input Bus Select — | Meaningful for the record command only. |
| | A Bus: Input frame data comes from the A Bus. |
| | B Bus: Input frame data comes from the B Bus. |
| Fast — | Meaningful for record and playback commands. |
| Normal: | tape speed field is used to select WBTR data rate. |
| Fast: | For high speed tape positioning only. Data can't be played back or recorded at this speed. Overrides tape speed field and number of frames to record or playback. The command field must be playback or record to start the WBTR. |
| Tape Speed — | Select WBTR data rate for record or playback. |

Wide Band Tape Interface Status Word Format:

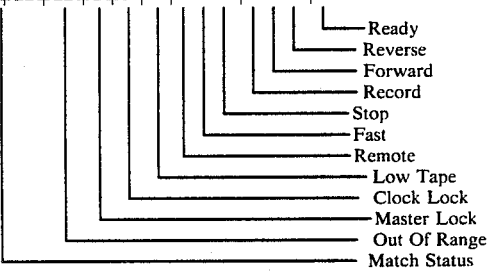

```
Bit 0 (Ready)       — 0: WBTR not ready to accept next command
                      1: WBTR read to accept next command
Bit 1 (Reverse)     — 0: Tape is not moving in reverse direction
                      1: Tape is moving in reverse direction
Bit 2 (Forward)     — 0: Tape is not moving in forward direction
                      1: Tape is moving in forward direction
Bit 3 (Record)      — 0: Frame data is not being recorded on tape
                      1: Frame data is being recorded on tape
Bit 4 (Stop)        — 0: WBTR is not stopped
                      1: WBTR is stopped
Bit 5 (Fast)        — 0: WBTR is not operating at high speed
                      1: WBTR is operating at high speed (no
                         record/playback)
Bit 6 (Remote)      — 0: WBTR control is from console panel
                         (local)
                      1: WBTR control is from the LS-11
                         interface
Bit 7 (Low Tape)    — 0: Tape supply is not low
                      1: Tape supply is low (tape head is close
                         to the end of the tape)
Bit 8 (Clock Lock)  — 0: Clock lock error has not been flagged
                      1: Clock lock error has been flagged
Bit 9 (Master Lock) — 0: Master lock error has not been flagged
                      1: Master lock error has been flagged
Bit 10 (Out of Range) — 0: No bad commands have been detected or
                           flagged
                        1: A bad command has been detected and
                           flagged
Bits 11-12 (Match Status) — 00: A match has been found between tape
                                frame header and header RAM
                            01: Header RAM frame count tape frame
                                count but rest of header data matches
                            10: Header RAM frame count tape frame
                                count but rest of header data matches
                            11: No comparison (no match found)
```

"X" denotes an unused bit

Wide Band Tape Header RAM Description

The wide band tape header RAM performs three functions. First it is used to record header data received from the LSI-11 along with frame data. Secondly it is used to make the frame header data available to the LSI-11 during playback. Lastly it is used for comparing a 16 byte subset of header data including frame count obtained from the LSI-11 with frame headers on wide band tape during "stop on match" mode playback. When a match is detected the WBTR stops. In both modes of playback the header RAM contains the header data for the current frame.

Transferring Header RAM Data To/From The LSI-11

Transfer of header RAM data to/from the LSI-11 is accomplished by initiating a DMA read/write of 194 words with the read/write header data function code (make sure WBTR device address has been selected). Formats for DMA data for read/write of WBTR header RAM are described in detail below:

| Data Formats | | |
|---|---|---|
| | Read Header Data | Write Header Data |
| Words | Description | Description |
| 1 | Length of data transferred in bytes should be (388) | Length of data transferred in bytes should be (388) |
| 2 | Frame count | Compare mask |
| 3-10 | Match header data | Match header data |
| 11-194 | Optional header data | Optional header data |

Notes:
(1) - Bytes 15-16 of match header data area are reserved for frame count compare and must be used when comparing frame count.
(2) - Compare mask format:
Bit 0
0: Don't compare 1st byte of match data.
1: Compare 1st byte of match data.
Bit 15
0: Don't compare 16th byte of match data.
1: Compare 16th byte of match data.
(3) - When writing header RAM for purposes of preparing for the compare mask (word 1) must be include even through it is not used.

WIDE BAND TAPE RECORDER INTERFACE

Figure 8:
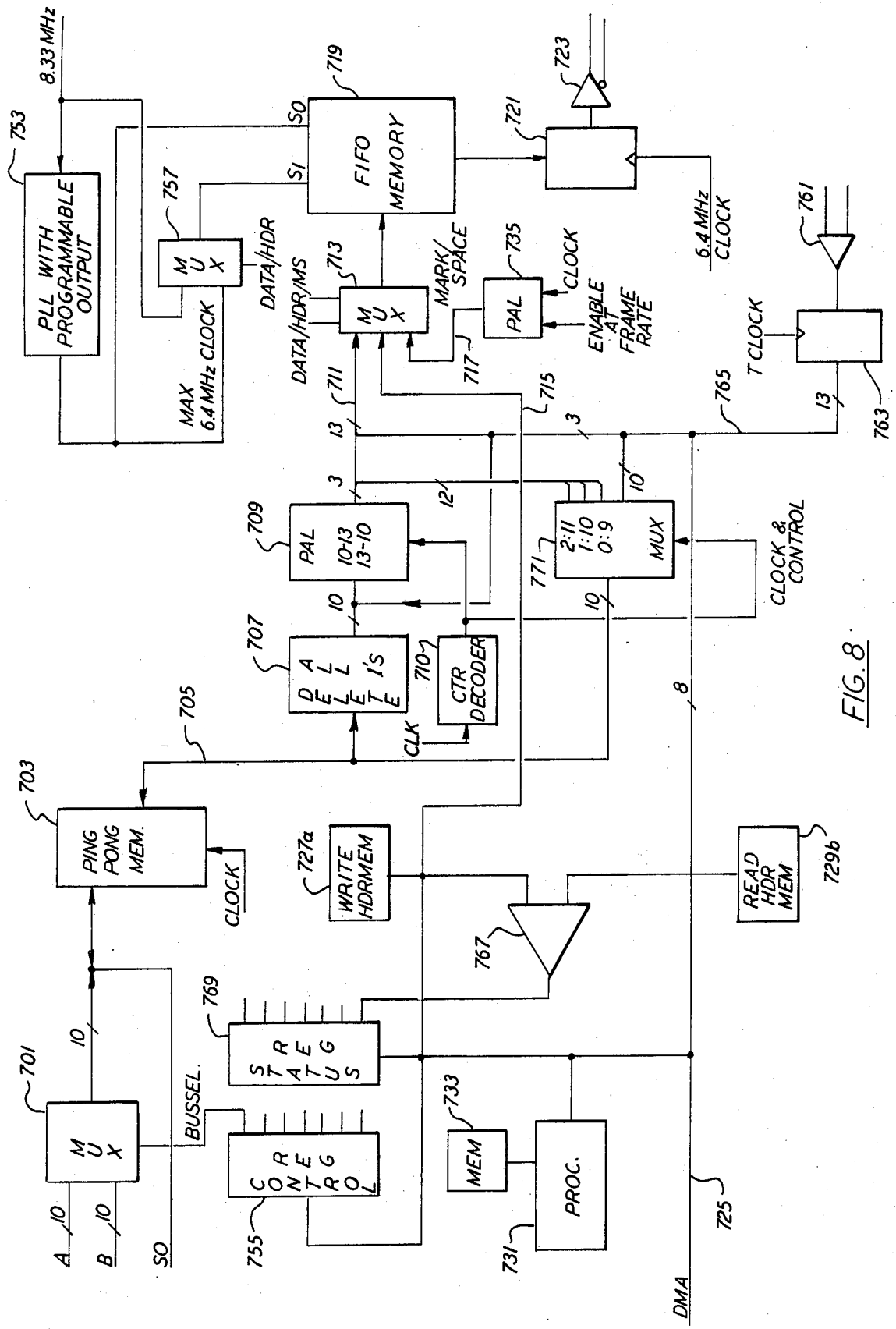
FIG. 8 is a block diagram of the wide-band tape interface of the present invention.

FIG. 8 is a block diagram of the wide band tape recorder interface which responds to the controls just described. Incoming data to be recorded, i.e. 10 bit words, each representing a pixel, on either bus A or B and is coupled into a multiplexer 701. The output of the multiplexer, which is also a 10-bit word, is coupled to a ping-pong memory 703. The ping-pong memory, in conventional fashion has two sections. While data is being read into one section, data is read out of the other. Data read out on line 705 is coupled through a logic circuit 707 which convert's any data word which is all ones by subtracting one from it. This is necessary since a mark used as identifying information n the system contains all ones.

The tape recorder contains thirteen channels. It, thus, becomes necessary, if one is to get dense packing, to convert the ten bit word into a 13-bit word format. This is done utilizing a programmable logic array (PAL) 709. The PAL breaks up certain of the words into 3-bit segments which are then added to other words to achieve a 13-bit signal on line 711. Line 711 is one input to a multiplexer 713. Multiplexer 713 has as its other inputs a header input on line 715 and a mark/space input on line 717. The manner in which these are generated will be described below.

The output is coupled from multiplexer 731 into a first in, first out (FIFO) memory, the output of wnich, after being clocked through a flip-flop array 721 and a driver 723 for impedence matching forms the final output to the tape recorder. Although only a single differential output is shown here, it will be recognized that there are thirteen such outputs, one for each channel.

As indicated above, header information is provided from the host computer over the DMA bus 725. Coupled to this bus is the header memory which includes a write header memory section 727a and a read header memory section 729b. Also coupled to the DMA bus is a processor 731 with its program memory 733. In conventional fashion, in the manner described above, processcr 731 formats the header information and develops certain control signals for use in the system in accordance with information stored in a control register 755 and in its memory 733. The header information to be written will be stored in memory 727a, and is provided as an input to multiplexer 731 under control of the processor 731. Mark and space information is generated by a programmable logical array (PAL) having clock and enable inputs. A control input from the processor 731 will enable the array 735 to produce the mark and spaces when necessary. This occurs at the frame rate, one each frame for approximately one line time.

FIG. 9 shows the arrangement of data on the tape. Shown is a section 741 composed of twelve full lines of all ones called marks. This is followed by a line 743 of all zeros call a space. Thereafter follows the header data supplied from the header memory 727a, this being designated as section 745. This in turn is followed by another line of zeros 747 followed by a pattern of marks and spaces 749. At the end of this pattern is the first line of data 751. The Header information takes up 400 13 bit words which is the equivalent of one line of digitized video data words. The data, as can be seen in more detail from FIG. 10, is made up of the ten less significant bits from the words 2, 3, 4, 6, 7, 8, 10, 11, 12 and 13 of a group of 13 words. The three most significant bits are obtained by breaking up the words 1, 5 and 9. FIG. 10 shows in detail, how the ten bits of each of these words is broken up and added onto the ten less significant bits. After thirteen words, the process repeats. Of course, each word represents a pixel. Each line is 512 pixels and thus requires 40 groups of 15 bit words or 400 lines. After 512 video lines, the 512th line 752 shown at the left of FIG. 9, (512×400) lines on the tape, the process repeats. This process is under the control of a counter/decoder 710 which provides control inputs to PAL 709. Counter decoder in addition to including a 13 bit counter counts lines and frames.

The tape recorder should receive material at a constant rate which at a maximum corresponds to thirty frames per second. Information is read into the memory 713 at the system clock frequency of 8.33 MHz. Because of the compression it is read out at 6.4 MHz rate at the maximum. The 6.4 MHz clock is developed in a phase-locked loop with a programmable output. The phase-locked loop receives its instruction as to the frame rate or its division ratio from the control register 755 which is also connected to the DMA bus. The various signals into the control register are described above. An example of one of the signals is the bus select which couples into multiplexer 701. Thus, a maximum 6.4 MHz clock signal provides the output clock for memory FIFO 719. It is also one input to a multiplexer 757 providing the input clock for FIFO memory 719. A second input to the multiplexer 757 is the 8.33 MHz clock. Normally, when data is being transferred into the FIFO memory it is transferred in at the 8.33 MHz rate. However, header and mark and space information is transferred in at the lower rate and thus, the multiplexer is provided for this purpose.

When playing back, the signal from the tape recorder, into the interface, is coupled through a buffer amplifier 761 and flip-flops 763, controlled by the tape clock, to provide a 13-bit output on bus 765. The eight least significant bits are provided to header memory 729b to permit comparison with a desired header that is being searched for, contained in write header memory 727a. If a comparison or match is detected by comparator 767 this signal is provided to a status register 769, which has additional inputs from the tape recorder as indicated above describing this status word, and this may be used by the host processor and local processor 731 to carry out further control of the tape. The incoming signal is also coupled into a combining circuit 771 and to the PAL 709. The three most significant bits go into the PAL 709 where they are recombined back into words. A multiplexer 771 receives as inputs the ten most significant bits from each of the incoming signals along with the outputs from the PAL which is on a 12-bit bus with only ten bits connected into each of the three inputs, of the multiplexer 771 in the manner indicated. In accordance with FIGS. 10 and 11, the multiplexer is controlled by counter/decoder 710 to select in sequence each of the proper words which are then transferred to the ping-pong memory 703 from which they are coupled onto the output bus SO.

2-D FILTER

The primary function of the 2D filter 23 is to perform edge enhancement of image frames in real-time. It operates either under computer control or in "live" mode. Computer controlled operation is used for purposes of diagnostics and initialization. "Live" mode refers to the real-time operation of the 2-D filter. Because of the requirement for high speed, multiplications involved in low pass computation and companding are implemented via high speed RAM table lookup (LUTS). This requires 4 1024×20 RAM multiplier lookup tables which must be loaded from the host computer before operating the 2-D filter. The 2-D filter also has 8 1024×10 delay memories to buffer the incoming input data. All control and data transfer to and from the 2-D filter is done through the DRV11-J quad parallel interface 118 of FIG. 2. The device uses a first parallel I/O port for address and a second is used for data. The table below gives port addresses and their respective functions.

| Address (Decimal) | Data Mask (Decimal) | WRT/RD | Live Comp | Function |
|---|---|---|---|---|
| 0 | 1 | WRT | Both | Select 2-D filter operating mode 0 = "live" (real-time) 1 = computer control (off-line oper.) |
| 1 | X | X | Comp | clears write memory bank counter (mem bank 0 selected for write) |
| 2 | X | X | Comp | select next memory bank (increment counter) |
| 3 | X | X | Comp | clear address counter (address common to delay memory and all multipliers) |
| 4 | X | WRT | Comp | 1 = disable write/ enable read 0 = enable write/ disable read |
| 5 | X | X | Comp | clears read memory bank counter (mem bank 0 selected for read) |
| 6 | | | | spare |
| 7 | 1023 | WRT | Comp | write to delay memory |
| 8–15 | | | | spare |
| 16 | 1023 | RD | Comp | read from delay memory |
| 17 | 8191 | RD | Both | read sum port (vertical sum of the 7 × 7 kernal i.e. total of 7 pixel values |
| 18 | −1 | RD | Both | read accum output (top) |
| 19 | −1 | RD | Both | read accum output (bottom) |
| 20–23 | | RD | | spare read |
| 24–31 | | | | spare |
| 32 | −1 | RD/WRT | Comp | read/write multiplier lut C3 lower order 16 bits |
| 33 | 15 | RD/WRT | Comp | read/write multiplier lut C3 high order 4 bits |

-continued

| Address (Decimal) | Data Mask (Decimal) | WRT/RD | Live Comp | Function |
|---|---|---|---|---|
| 34 | −1 | RD/WRT | Comp | read/write multiplier lut C2 low order 16 bits |
| 35 | 15 | RD/WRT | Comp | read/write multiplier lut C2 high order 4 bits |
| 36 | −1 | RD/WRT | Comp | read/write multiplier lut C1 low order 16 bits |
| 37 | 15 | RD/WRT | Comp | read/write multiplier lut |
| 37 | 15 | RD/WRT | Comp | read/write multiplier lut C1 high order 4 bits |
| 38 | −1 | RD/WRT | ComP | read/write multiplier lut C0 low order 16 bits |
| 39 | 15 | RD/WRT | Comp | read/write multiplier lut C0 high order 4 bits |
| 40–47 | | | | spare |
| 48 | −1 | RD/WRT | Comp | read/write compander multiplier lut low order 16 bits Note: All values should be = 480 |
| 49 | 15 | RD/WRT | Comp | read/write compander multiplier lut high order 4 bits Note: Lut actually holds 19 bit signed values so only 3 bits are used for address |
| 50 | 2047 | WRT | Both | load high pass offset constant |
| 51 | 7 | WRT | Both | Select background mix (B) factor |

|  | 4 | 2 | 1 | Function |
|---|---|---|---|---|
|  | 0 | 0 | 0 | Disable B |
|  | 1 | 0 | 0 | B/1 |
|  | 1 | 0 | 1 | B/2 |
|  | 1 | 1 | 0 | B/4 |
|  | 1 | 1 | 1 | B/8 |

Background mix is added to high pass result.

| Address (Decimal) | Data Mask (Decimal) | WRT/RD | Live Comp | Function |
|---|---|---|---|---|
| 52 | 1 | WRT | Both | Selects background 0 = Low Pass 1 = "Live" |
| 53 | 3 | WRT | Both | Selects output from 2-D filter 0 = "Live" (bypass) 1 = Low Pass 2 = High Pass |
| 54 | −1 | RD/WRT | Both | read status/select input data bus status: Bit 0: Background selection 0 = Low Pass 1 = "Live" |

Bits 1–3: Background mix factor

| Bit | Disable | B/1 | B/2 | B/4 | B/8 |
|---|---|---|---|---|---|
| 1 | 0 | 0 | 0 | 0 | 1 |
| 2 | 0 | 0 | 0 | 1 | 1 |
| 3 | 0 | 1 | 1 | 1 | 1 |

Bits 4–5: 2-DF output selection
0 = "Live" (bypass)
1 = Low Pass
2 = High Pass

Bit 6: Live/computer control
0 = "Live" (real-time)
1 = Computer control

Bit 7: Delay memory write status
0 = Write enabled
1 = Write disabled

Select input bus:
Bit 15:
0 -  TBD 
1 =  TBD

| Address (Decimal) | Data Mask (Decimal) | WRT/RD | Live Comp | Function |
|---|---|---|---|---|
| 55 | 1023 | RD | | Read 2-DF output port |
| 55 | 1023 | RD | | Read 2-DF output port |

2-D Filter Kernal And Its Coefficients

The 2-D filter employs a 7×7 rectangularly symmetric kernal represented below:

| H3 | H3 | H3 | H3 | H3 | H3 | H3 |
|----|----|----|----|----|----|----|
| H3 | H2 | H2 | H2 | H2 | H2 | H3 |
| H3 | H2 | H1 | H1 | H1 | H2 | H3 |
| H3 | H2 | H1 | H0 | H1 | H2 | H3 |
| H3 | H2 | H1 | H1 | H1 | H2 | H3 |
| H3 | H2 | H2 | H2 | H2 | H2 | H3 |
| H3 | H3 | H3 | H3 | H3 | H3 | H3 |

H3, H2, H1, and H0 are the four kernal coefficients required for this kernal and are computed by any function having a range between 0 and 1 and has the values 0, 1, 2, and 3 in its domain. Prior study has shown, however, that best results wnen the function:

$$H[I] = COS(IPi/6)^2$$

,where I=0, 1, 2, 3, is used to compute the kernal coefficients. In order to simplify hardware implementation of the algorithm to compute low pass output the scenario detailed in the next section is required to compute new kernal coefficients consistent with the hardware implementation.

Scenario for loading coefficient multiplier Lut's (C0-C3)
(1) Put 2-D filter in computer contol mode.
(2) clear address counter before loading multiplier Lut C[I]
(3) Compute value for C[I,J]as follows:

$$\frac{(H[I] - H[I+1]) \times 8192}{H[0] + 8H[1] + 16H[2] + 24H[3]} \times J$$

Where:
I represents which multiplier Lut 0 ... 3
J represents multiplier Lut address 0 ... 1023
H[0 ... 3] represent the filter kernal coefficients as described in the preceding section.

This Scenario must be done once for the low order 16-bit data addresses for each Lut and repeated for the high order 4-bit addresses.

Scenaric for loading compander multiplier Lut (C4)
(1) Put 2-D filter in computer control mode.
(2) Clear address counter before loading multiplier Lut C [I].
(3) Compute value for C [4,J]as follows:

$$[1-EXP(J/BMAX)] \times J \times BMAX$$

Where:
BMAX represents a user determined constant ($0 \leq BMAX \leq 512$). BMAX must also be loaded as the high pass offset constant (addr 50).
J represents compander Lut address 0 ... 1023.
This scenario must be done once for the low order 16-bit data addresses for each Lut and repeated for the high order 4-bit addresses (of which 1st 3 bits are used and bit 2 is the sign bit).

2-D Filter Real-Time Operational State Definitions

For the 2-D filter realtime operational state to be completely and properly defined the following addresses must have been written with appropriate data under computer control:

| Address | Description | Data |
|---------|-------------|------|
| 0 | Operating mode | 0 for "live" real-time |
| 32-39 | Coefficient multiplier Lut's | As described above |
| 48-49 | Compander multiplier Lut | As described above |
| 50 | High pass offset constant | BMAX as described above |
| 51 | Background mix factor | User determined |
| 52 | Selected background | User determined |
| 53 | Selected 2-DF output | User determined |
| 54 | Selected 2-DF input bus | User determined |

*May be modified under real-time operating mode.

2-D Filter Hardware

Figure 12:
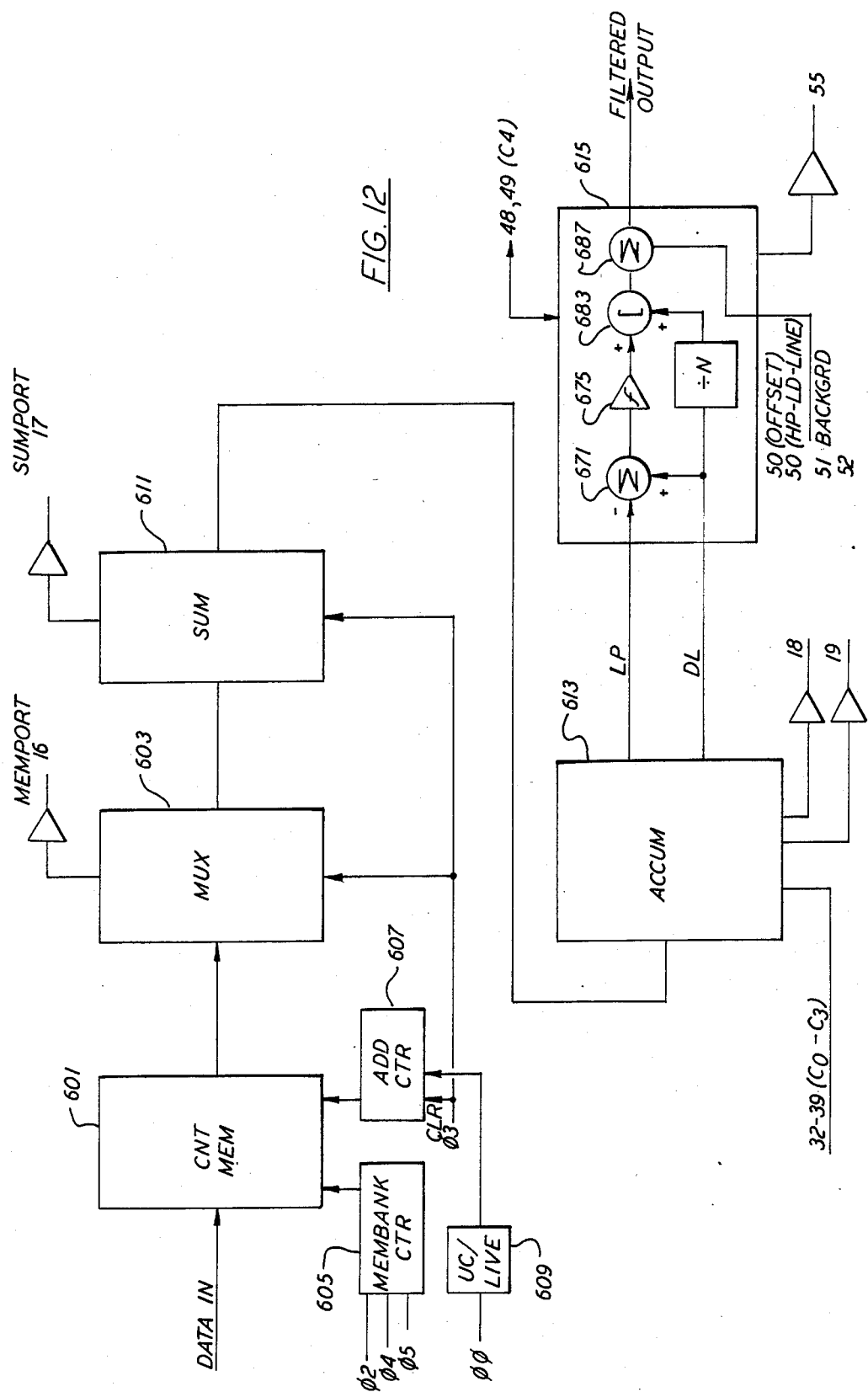
FIG. 12 is an overall block diagram of the 2-D filter utilized in the system of the present invention.
Figure 13:
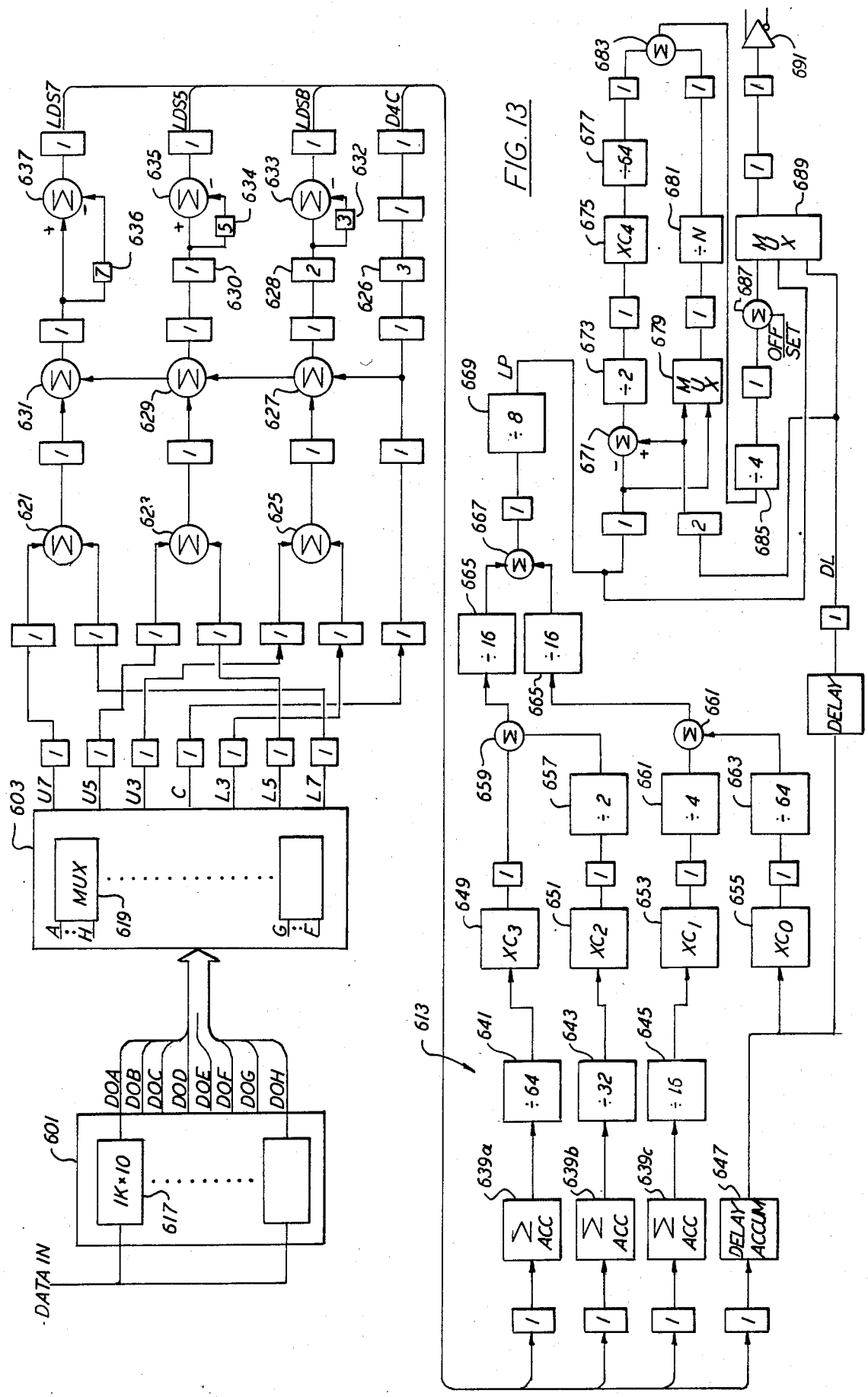
FIG. 13 is a more detailed block diagram of the 2-D filter of FIG. 7.

FIG. 12 is a basic block diagram of the 2-D filter. As noted above, the 2-D filter operates on the general principles described in the aforementioned article from the Proceedings of the Society of Photo-Optical Instrumentation Engineers, published in 1978. The first element of the 2-D filter is the delay memory 601; incoming data is buffered in this memory. From the delay memory 601 data is directed to a multiplexer 603 where it is multiplexed so as to achieve a scanning kernal moving vertically down. The delay memory receives control inputs from a memory bank counter 605 and an add counter 607. Some of the inputs to the various units such as the counter 605 and counter 607 are designated by numerals. These numerals correspond to the addresses given above in the Table. Tne counter 607 receives one of its inputs from a flip-flop 609 which indicates whether the 2-D filter is operating live or under computer control. This is the first or zero address. Address 16 corresponds to an output from the multiplexer used in the "computer" mode for reading from the delay memory.

The multiplexer output is provided to a summing module 611 which also has an output port 17 used to initiate reading of the sum which has been generated. Here a sum of seven pixels in a line of the seven by seven kernal is carried out. The output of the sum module 611 is provided to the accumulator 613. In the accumulator which is loaded with the coefficients C0 to C3, after accumulating data for seven rows, the results are multiplied by the coefficients. The output of the accumulator thus is the weighted value based on the seven by seven kernal described above. Outputs at addresses 18 and 19 indicated that it is time to read the top and bottom of the accumulator respectively. This is a low pass convoluted output. Also provided through the accumulator is the central pixel and thus, a value of the pixel not convoluted but simply delayed is provided. Thus, there are two outputs from the accumulator, one indicated as LP, the low pass, and the other designated as DL or a delayed output corresponding to the input.

The outputs are then provided to a compander 615 which is loaded with coefficient C4. Before companding, using the function described above, the low pass signal is subtracted from the line signal DL to obtain a high pass signal. In addtion background and offset are added to the signal as will be seen in more detail below. Within the compander, in addition to these functions, various possibilities are provided for selecting different outputs. It is possible to select a low pass output, a delayed output or the high pass output. The final output of the compander 615 is the filtered output. Also provided is an output at address 55 indicating that the output should be read.

One line of information is loaded in each memory, at present 512 pixels. The 1K memory permits an increase to 1000 lines of resolution if desired.

FIG. 8 is more detailed block diagram of the 2-D filter. Memory 601 comprises a plurality of eight 1K by 10 bit memories 617 by memory bank counter. The outputs of each of these memories will be a a sequence of pixels, specifically one of the seven pixels in a column of the scanning kernal. Provision is made for an overlap of one line. Thus while seven lines are being read, in response to add counter 607, the eighth is being loaded. Indexing of which line is being loaded is done by counter 605. In the multiplexer 603 are provided a plurality of multiplexer modules 619. Each of the multiplexer modules has the eight outputs of the memory as inputs. However, the order is different. The first multiplexer starts with the A output, the second multiplexer with the B output and so forth. The outputs of the multiplexers corresond to a row of the seven by seven scanning kernal. After the first 7 rows A-G are scanned, counter 605 indexes by one and row B-H scanned out where the next line is read into A. On the next scan, Rows C-H and A are provided as the seven outputs and soon. These outputs are designed U7, U5, U3, C, L3, L5 and L7.

At various points in the circuit are blocks with numbers 1, 2, 3, 5, 7 etc. in them. These blocks represent delays of a corresponding number of clock periods. As shown, the U7 and L7 outputs after delays are summed together in a summer 621. Similarly the U5 and L5 outputs are summed in 623 and the L3 and U3 in 621. The center pixel is coupled through by itself. After being summed, each of the outputs go to an additional summer. Starting from the bottom the center pixel is summed with the sum of L3 and U3 in a summing means 627. This sum is then summed with sum of U5 and L5 in summing means 629 and that in turn summed in summing means 631 with sum of U7 plus L7. The center pixel passes through a number of delays and eventually is provided into the accumulator 613. The output of the summing means 627, after three delay times, is summed in a summing means 633 with the input to that summing means delayed three further delay times, the delayed input being subtracted, to provide a final output. Similarly the output of the summing means 629, after being delayed one extra delay time, is provided to another summing means 635 from which this input, delayed five delay times, is subtracted. The output of the summing means 631 is coupled into another suming means 637 where the input delayed seven delay times is subtracted from it.

The output of the summing means are provided to the accumulator, where each of the individual outputs, except for the center output, is provided to a summing accumulator 639a, 639b or 639c. The respective summing accumulators provide their outputs to dividers, the top output being divided by 64 in a divider 641 the next being divided by 32 in a divider 643 and the next by 16 in a divider 645. The center pixel is simply delayed through a delay 647. The outputs of the delay 647 and the dividers 641, 643 and 645 are provided to the coefficient multipliers in which the coefficients are stored. To carry out the multiplications at the necessary speed, these comprise lookup tables (LUTS) which have been preloaded as described above. Thus, the output of divider 641 is coupled to multiplier 649 to be multiplied by C3, that of divider 643 into multiplier 651 to be multiplied by C2 that of divider 645 into multiplier 653 to be multiplied by C1, and the output of the delay means 647 into multiplier 655 to be multiplied by C0.

The output of multiplier 649 is summed with the output of multiplier 651 divided by 2 in a divide by 2 divider 657 using summing means 659. Similarly in summing means 661 the output of multiplier 653 divided in a divide by 4 divider 661 is summed with the output of mulipler 655 divided by 64 in a divide by 64 divider 663. The outputs of the two summing means 659 and 661 are each divided by 16 in divide by 16 dividers 665. The outputs of these two dividers are summed in summing means 667. Finally, the output of this summing means is divided by 8 in a divide by 8 divider 669 to provide the low pass output.

Referring to the scanning kernal above it can be seen that for H3 pixels (to be multiplied by C3) 7 rows must be accumulated, for H2, 5 rows, and for H1 3 rows. In accumulator 639a, after 7 rows, i.e. on the eight row the first input added in must be subtracted out. This is the purpose of 7 clock period delay 636. Thus, the last seven rows are always accumulated in accumulator 639a. In accumulator 639b, the last five rows, offset by 1 due to delay 630 are stored because of the subtraction through delay 634. Similarly, in accumulator 639c, the last 3 rows, offset by two, due to delays 628 and 632 are stored. Finally, consistently, the center pixel is delayed 3 clock periods in delay 623 to give at the output a low pass signal representative of the kernal given above. The divisions are for purposes of scaling; the location before or after the multipliers is chosen to obtain the highest accuracy possible.

The output of the delay means 647 is coupled through an additional delay to provide the output DL. The LP output, after one delay, is subtracted from the DL output, delayed two times, in summing means 671. This quantity is divided by 2 in a divide by 2 divider 673 and then multiplied in a lookup table multiplier 675 by the companding function. This result is divided by 64 in a divide by 64 divider 677. A multiplexer 679 receiving as its input the address 52 selects the background as low pass or live. Live is, of course, the DL output. The output of the multiplexer is coupled into a divide by N divider 681 which receives an input indicated by address 51 which selects the background mix. The background is then summed with the companded low pass output in a summing means 683. This output is divided by 4 in a divide by 4 divider 685 after which it is summed with an offset defined at address 50 in summing means 687. The output of summing means 687, the low pass output and the delayed (live) output are provided as inputs to a mulitplexer 689 which selects the final filter output which is coupled through a line driver 691. In response to address 53, it is possible to select live, i.e. bypass operation, low pass or high pass.

SYSTEM OPERATION

Initilization

The initialization task initializes the system software. In addition the following system components are initialized: voice recognition terminal, frame processors, and the two dimensional filter. During software initialization, all system event flags used were cleared. All information from the system definition file is read and stored appropriately into resident common. Operational parameters for the voice recognition terminal (VRT) are defined. The VRT vocabulary is downloaded from the file, vocabulary to the VRT device. Macros are read from the frame processor macro defintion file macros data as described above and loaded into the appropriate frame processors. The default ITT (linear ramp) are read from the ITT file (ITTS. DAT) and loaded into each frame processor's ITT. The frame processors are placed in the default configuration. The 2-D filter kernal coefficients are computed, scaled, and loaded into multiplier RAMS C0-C3 as described above. The compander ITT is computed and loaded. The high pass offset is set to 0. Background mixing is disabled. "Live"-(un-filtered) data is selected as background. "Live" data is selected as output (bypass mode). The A-bus is selected to be the source of input data.

All menus are displayed on the ISC terminal 39. The top level menu as well as the backup to previous menu choice is always visible on the ISC and selectable by the operator. Menus are assigned numbers starting from 1and increasing as they are defined and implemented in the System.

SOFTWARE FUNCTIONS

The support software consists of six major entities:
executive;
resident common;
acquisition;
analysis;
archival; and
device drivers.
A software task (self-contained program) exists for each entity.

The resident (residing in memory at all times) common exists to hold data that is to be shared among the software tasks and data for communications between tasks.

The executive software task performs the following functions: startup, menu processing and software task control system, emergency shutdown.

The following menu will be acted upon by the executive task:
1. System
2. Acquisition
3. Analysis
4. Archival
5. Emergency The startup function initializes the system and sets up the default system configurations. Startup functions include:
(A) Initiate acquisition, analysis, and archival tasks.
(B) Generate default system status mask word.
(C) Read system definitions from the system definition file such as colors used for menus, voice tolerances, default camera type, etc.
(D) Setup default image enhancement system (IES) 21 configuration.

All menu selection input and display of menus is done by menu directing software from within the executive task. Any "action" dictated by operator menu selections is dispatched to the appropriate task by the menu directing software. The default input device for operator menu selections is the light pen/keyboard.

The system mode provides the operator with capability of redefining the system status (diagnostic submode) and enabling/disabling voice input device.

The following menu is acted on here:
1. Diagnostic submode
2. Voice input enable
3. Voice input disable
4. Select camera type
5. Shutdown In the diagnostic submode the system queries the operator for subsystem status from the input device and updates the system status mask word.

The following menus are acted on here. The menus are displayed in order without erasing the screen between menus.

| DIAGNOSTIC SUBMODE | | |
| --- | --- | --- |
| 1. Go | 2. No Go | non-interlaced frame processor |
| 1. Go | 2. No Go | Alu Frame Processor #1 |
| 1. Go | 2. No Go | Alu Frame Processor #2 |
| 1. Go | 2. No Go | display frame processor |
| 1. Go | 2. No Go | interlaced frame processors |
| 1. Go | 2. No Go | wide band tape recorder |
| 1. Go | 2. No Go | 2-D filter |
| 1. Go | 2. No Go | color image display |
| 1. Go | 2. No Go | modem |

The operator has a choice of either re-calling saved voice data or re-training the voice recognition terminal (VRT) by responding to a series of prompts to pronounce each of the system vocabulary words. After voice training the operator has the option to save his vocabulary in the user vocabulary file.

The following menu is acted on here:
Voice Enable
1. Re-call
2. Train

When voice re-call is selected the voice reference patterns from the previous training session is re-called and the VRT is enabled. All operator menu selections must be made verbally, including disabling voice input. (Voice input is automatically disabled if 5 consecutive unrecognized utterances are encountered.)

When voice training is selected the operator is instructed to speak each of the vocabulary words. If a word is not spoken "clearly," it may be necessary to say a word more than once.

After the last vocabulary word has been spoken, the operator is given the option of saving the voice reference patterns, and thus replacing other patterns, or simply proceeding. In either case, all subsequent menu selections must be made verbally.

The following menu is acted upon after the training:
Save voice reference patterns?
1. Yes
2. No With voice input disable, voice input is no longer recognized and the input device becomes the light pen/keyboard.

To select camera type the operator must indicate whether the camera being used is interlaced or non-interlaced. This information is used to configure the frame processor 111 during acquisition. Normally this option will not be changed. Its default value is defined at system startup.

The following menu is acted on here:

Select Camera Type
1. Interlaced
2. Non-Interlaced

In emergency mode the software commands the IES to the emergency configuration. This configuration consists of routing the image from the digitizer interface 103 through the 2-D filter 23 to the real-time monitor 25. The 2-D filter 23 is configured to pre-defined conditions. When this mode is selected, an appropriate message is written to the ISC terminal. Operator selection of emergency mode has no effect on the system status words. The IES remains configured as described above until a subsequent protocol has been selected for acquisition.

The shutdown function prepares the system for power removal in order to prevent loss of data and equipment damage where possible.

Shutdown functions are as follows:
(A) Command the IES hardware to perform power down functions;
(B) Close all active files in the data base; and
(C) Shutdown all tasks in an orderly fashion.

Acquisition Task

The acquisition task performs all real-time operations. Its functions are to enter current patient information, to implement protocols, and to allow for operator inspection of and updates to the available list of protocols.

A protocol consists of information to control the IES 21 real-time operations. Each protocol is identified by a name. A protocol is, specifically, a data structure which is described as follows:

First record—bookkeeping information
1. Protocol number
2. Number of steps
3. Deletability code
4. Date created Subsequent records—protocol steps
1. Menu number
2. IES function number
3. Delay time A protocol step consists of displaying to the operator a menu, getting input from the operator, performing an IES function (see below), and delaying for a specified interval. An "IES function" (IESF) is a list of commands and data sent which either configure one or more frame processors or tell one or more of the subsystems to do something. An IESF is implemented as a Fortran program, which utilizes a device driver to perform DMA transfers to/from IES subsystems as described above in connection with these subsystems. A fixed number of IESF routines are implemented as part of the system. They are loaded as part of the acquisition task.

Each IESF is assigned a number and an 80 character textual description. IESF routines have parameter inputs as needed. Parameters consist of items required by an IESF in order to perform its function such as: ITT number, WBT speed, 2-D filter parameters etc. Where applicable backup modes for degraded operation are built into the IESF routines.

Whenever necessary, a protocol step will have a menu associated with it for operator selected IESF parameters. Related files are described below.

The following is the highest level acquisition menu:

ACQUISITION

1. Enter patient information
2. Show current patient information
3. Show available protocols
4. Start a protocol The menu selection "Enter Patient Information" provides a means for the operator to explicitly define the "current" patient to the system. (The patient is implicitly defined in archival mode.) A "patient data entry" form is displayed on the ISC terminal. The cursor is positioned to the lines in order, top to bottom. At each line, the operator types the appropriate information followed by a carriage return.

Data entry terminates when the last line on the form has been entered. No provisions are made for "backing up" to previous lines to modify data or for entering data out of order.

The data entry form is as follows:

---

PATIENT DATA ENTRY

Patient Name: _____

Patient ID # _____

Height (inches): _____

Weight (pounds): _____

Pulse rate (per minute) _____

Radiologist's last name: _____

Technicians last name: _____

Referring physician: _____

Comments (enter null line to terminate):

_____

_____

_____

---

Selecting "show current patent" information causes the current patient information to be displayed on the ISC terminal in the same format as it was entered. The "backup" menu selection will be needed to return to the preceding menu.

By selecting show available protocols all available protocols are displayed on the ISC terminal, one protocol at a time. At the end of each display, the operator is given a choice, to be selected via light pen or voice, of either showing the next protocol or terminating the listings, i.e. returning the preceding menu.

The protocol display is written in normal height letters (instead of the normal double height letters of most menus) and will appear as follows:

PROTOCOL$_{13}$

This protocol consists of . . . steps as follows:
(1) Show operator menu #. . . (action, IES configuration, or what happens) delay for . . . seconds
(2) Show operator menu #. . . (action, IES configuration, or what happens) delay for . . . seconds Etc.
1. . . . Continue with protocol list 2. Stop When the selection is to start a protocol the operator is prompted for the name of the protocol to be started. (Entering only a carriage return will cause the system to backup to the previous menu.) Once the name of a valid protocol name has been entered, the procedure will begin.

Whenever a menu selection is made as part of the protocol, the operator may select emergency mode which will have the effect of putting the image enhancement system in emergency mode and thus aborting the protocol.

ANALYSIS TASK

The Analysis Task performs a variety of operator selected functions on images that are "on-line" in the system data base. Image alignment and cyclic study functions are performed on image data residing on frame processors.

The following is the highest level analysis menu:

| ANALYSIS |  |
| --- | --- |
| Select and display files: 1. A 2. B 3. C 4. D | |
| 5. Describe "on-line" files | |
| Select analysis function: | |
| 6. Grey scale cross-sectional plot | |
| 7. Contrast enhancement | 8. Annotate |
| 9. Software zoom | A. Hemodynamics |
| B. Image alignment | C. Cyclic studies |
| D. Maskless subtraction | |

Choices 1–4 select the on-line image to be displayed and to be used for subsequent analysis functions. The selected image is transferred to a refresh memory in video display unit 47. The intensity transformation table (ITT) for video display unit 49 will be set up to map the minimum and maximum image pixel values into the minimum and maximum intensities with a linear ramp in between.

The selection of "describe 'on-line' files" causes a description of each of the "on-line" files to be provided. The screen is replaced by the descriptions with the following menu:

1. Backup

With grey scale plotting the display is overlaid with a line extending across the full screen. A plot of the horizontal cross-sections for pixel value vs. position is updated on the display. The operator moves the line with the joystick 49.

Interactive joystick operation is terminated when the "enter" button is pressed.

Once contrast enhancement has been selected a lower level menu is displayed for the operator to select the desired image enhancement function on the image that is currently in the refresh memory.

The following menu is acted upon here:

CONTRAST ENHANCEMENT

1. Monochrome contrast adjustment
2. Pseudo-color contrast adjustment

If monochrome contrast adjustment is picked, the operator selects one method of monochrome contrast adjustment.

The following menu is acted upon here:

MONOCHROME CONTRAST ADJUSTMENT

1. Joystick window control
2. Joystick histogram threshold/clip
3. Histogram equalization
4. Restore original contrast Joystick window control allows the operator to vary gain and enhanced amplitude range. It accomplishes this by creating a 2-point transformation table, where the end points are varied as shown in FIG. 14.

One axis of the joystick 49 controls the endpoints of the window. The other axis controls the center of the window. Interactive joystick control is terminated when the operator hits the "enter" button on the joystick 49.

If histogram threshold/clip is selected, the image on the display is overlaid with a histogram of values between the maximum and minimum image pixel values, the operator selects a window on the scale by using joystick 49 to position the cursor and hitting the "enter" button at the desired window end points. The ITT for video display unit 47 is altered such that the selected grey level window occupies the full dynamic range (0–255) of intensity. The scale is marked to show the selected window.

When the second window end point is "entered," the histogram is erased and the ITT is modified appropriately.

The following is a depiction of the histogram scale:

```
l-------X------------------l-----------[ ]----------X--------l
SSS                       MMM                         LLL
```

Legend: SSS = Min Pixel value for displayed image
LLL = Max pixel value for displayed image
MMM = Midpoint for scale
X = Selected window endpoints
[ ] = Current cursor/joystick position When selecting equalization the display unit 47 ITT is loaded with a table representing the histogram equalization transformation function for displayed image. This function is computed from the prestored histogram data existing on the on-line file in the system data base for the displayed image.

If "restore original contrast" is selected, the display unit 47 ITT is loaded with the original values used for the selected on-line image.

By selecting pseudo-color contrast adjustment, the operator will be given the ability to apply a pseudo-color spectrum and a method of interactively modifying the pseudo-color.

The following menu will be acted upon here:

PSEUDO-COLOR CONTRAST ADJUSTMENT

1. Apply color spectrum
2. Joystick spectrum scroll
3. Histogram equalization
4. Restore original image The selection of "apply color spectrum" causes the 3 color ITT's (blue, green, and red) to be filled with values which map the range of pixel values in the image over the full range of intensities available in each ITT.

The color ITT's are then enabled. "Joystick spectrum scroll" allows the operator to use the joystick 49 to select the size of a color spectrum and the spectrum centerpoint. This color spectrum window is under operator control so that those intensity levels within the window are displayed in pseudo-color and those outside the window are displayed in a monochrome fashion.

"Histogram equalization" requires re-displaying the file with the data scaled such that the resulting histogram is equalized. The ITT is the same as the pseudo-color spectrum.

"Restore original image" will result in the original image, with the original monochrome ITT to be displayed. (If a histogram equalization has been done, it will be necessary to re-fresh the graphic memory for the on-line disk file.)

When "annotate" is selected the operator is prompted to enter a single line on the keyboard. The line will be written, as typed, at the bottom on color monitor 45 on the alphanumeric overlay. (The annotation can be erased by entering a blank line in response to the prompt.)

For "software zoom" the operator selects either 2:1 or 4:1 zoom factor. The image on the display is overlaid with a square box either 256×256 or 128×128 pixels in dimension. The operator moves this box with the joystick 49 to select the area to be zoomed. When the "enter button is pressed", the selected window is read from the "on-line" file in the data base, Pixels are repeated in a 2×2 or 4×4 pattern, buffered and output to the refresh memory. The operator must select "display image" to restore the original image after it has been zoomed.

The following menu is acted upon by the software zoom function:

SOFTWARE ZOOM 1. 2:1 zoom
2. 4:1 zoom

Once hemodynamics has been selected a lower level menu is displayed for the operator to select the desired hemodynamic function.

The following menu is acted upon here:

HEMODYNAMICS

1. Calibrate
2. Area/volume computation
3. Comparative computations
4. % stenosis calculation Upon selection of calibrate, the interactive terminal is cleared, the color monitor 45 is overlaid with a scale from 0 to 10 on the bottom extending horizontally across entire display, and a cursor is drawn on the monitor 45. The operator is instructed to position the cursor over the scale and digitize a point on the scale that corresponds to the length in centimeters that is to be calibrated. A point is digitized by pressing the enter button on the joystick 49. The operator is then instructed to digitize two points on the image the calibrated length apart. The length in pixels of the corresponding line segment is computed and the segment itself is drawn on the monitor. The scale factor for conversion from pixels to centimeters is computed and used in all subsequent distance, area, and volume calculations.

When hemodynamic functions requiring this scale factor are performed without first calibrating, all lengths, areas, and volumes will be displayed in pixels instead of centimeters.

Once area/volume computation has been selected a lower level menu is displayed for the operator to select an image for area/volume computation.

The following menu is acted upon here:

AREA/VOLUME COMPUTATION

Select on-line file image for area/volume computation
1. File A 2. File B 3. File C 4. File D
5. Current image Upon selection of the image for area/volume computation the interactive terminal is cleared and a cursor is drawn on the monitor 45. The operator is instructed to position the cursor and press the enter button to start tracing the contour. Tracing is continued by repeatedly moving the cursor with joystick 49 and pressing the enter button. Each time the cursor is moved and the enter button is pressed a line is drawn connecting the present cursor position with the cursor position at which the enter button was last pressed. Once the enter button is pressed two consecutive times without moving the cursor the trace is terminated and the contour trace is automatically closed. Termination of the trace will also occur if the maximum number of points has been reached. When the trace is terminated, a line will be drawn across the maximum point-to-point distance on the contour. The following is computed and displayed on the monitor 45; maximum line length in centimeters, area in square centimeters, and volume in cubic centimeters of the contour.

The static area is computed using a polygon triangulation technique. Basically, this technique computes the area to the left of each line segment of the contour. The sign of each area is the same as the slope the line segment. When the areas are summed, those areas "outside" the contour are subtracted from the total area to the left of the right-hand-side of the contour. The result is the area within the contour.

The volume computed is based on a circular rotation of the traced controur about its longest axis. Specifically, the formula, used is as follows:

$$V = (8/(3Pi))(A^2/D)$$

$$V = 0.84882436 \, A^2/D$$

WHERE:
Pi = 3.1415926
A = area within contour
D = maximum point-to-point on the contour Once comparative computations has been selected a lower level menu is displayed for the operator to select the end diastolic image.

The following menu will be acted upon here:

COMPARATIVE COMPUTATIONS

Select on-line file for end diastolic image
1. File A 2. File B 3. File C 4. File D 5. Current image Upon selection of the end diastolic image the video display unit 47 is cleared and the operator is instructed to trace the desired contour as in the regular area/volume computation. Calculated values are displayed on the monitor 45 as is in the regular area/volume computation. The trace coordinates are saved in a file.

Subsequently another menu is displayed for the operator to select the end systolic image.

The following menu is acted upon here:

| COMPARATIVE COMPUTATIONS |
|---|
| Select on-line file for end systolic image |
| 1. File A 2. File B 3. File C 4. File D |

Contour tracing and area/volume calculation and display occur as with the end diastolic image.

Another menu is displayed to allow the operator to inspect the results of end systolic area/volume computation before the display is erased.

The following menu is acted upon here:

COMPARATIVE COMPUTATIONS

1. Press here to view all results on monitor

When the operator makes the menu selection, the monitor 45 is cleared and the following information is displayed: maximum line length, area, and volume of both the end diastolic and end systolic controus, then the following are computed and displayed on the monitor 45: stroke volume in cubic centimeters, ejection fraction, cardiac output in liters per minute, and cardiac index, traces of the end diastolic and end systolic contours will also be displayed.

Stroke volume is computed by subtracting end systolic volume from end diastolic volume:

$$SV = V(diastolic) - S(systolic)$$

Ejection fraction is computed as the ratio of stroke volume to end diastolic volume:

$$EF = SV/V(diastolic)$$

Cardiac oCutput is computed by multiplying stroke volume by the patient's surface area:

$$CO = SV = PR$$

Cardiac index is computed as the ratio of cardiac output to the patient's surface area:

$$CI = CO/SA$$

Surface area is computed as function of the patient's height and weight:

$$SA = 0.007184 \, Weight^{.425} \, Height^{.725}$$

where:
Surface area is in square meters,
weight is in kilograms
height is in centimeters Another menu is displayed to allow the operator to view the results before all annotation is cleared for wall motion studies.

The following menu is acted upon here:

COMPARATIVE COMPUTATIONS

1. Press here to view wall motion only.

When the operator makes the menu selection, all annotation is cleared allowing the operator an unobstructed view of the end diastolic and end systolic contour traces.

Once % stenosis calculation has been selected a lower level menu is displayed for the operator to select an image for % stenosis calculation.

The following menu is acted upon here:

| % STENOSIS CALCULATION |
|---|
| Select on-line file image of % stenosis calculation |
| 1. File A 2. File B 3. File C 4. File D |
| 5. Current image |

Upon selection of the image for % stenosis calculation the interactive terminal is cleared and a cursor is drawn on the display. The operator is instructed to digitize a pair of points to define the vessel diameter above the stenosis. The corresponding line segment is drawn on the monitor 45. The operator is then instructed to digitize another pair of points to define the vessel diameter of the stenosis. The corresponding line segment is drawn on the monitor 45. The length of the two line segments are computed and the % stenosis is computed and displayed on the Deanza.

% Stenosis is computed as the ratio of the difference between the first and second line segments to the length of the first line segment multiplied by 100:

$$\% \, Stenosis = (Length \, 1 - Length \, 2)/Length \, 1 \; 100$$

IMAGE ALIGNMENT

When this selection is made the system will enter a mode whereby the operator can interactively offset the read-out of frame processor 113 using the cursor control keys on the ISC terminal 39. (It is presumed that the IES 21 is configured in some way such that the contents of this frame processor are directly related to what is being displayed on the real-time monitor 25. For example, the system could be in a frame-to-frame subtraction mode with the difference image on the monitor 25.)

In this mode, each time the operator depresses one of the 4 "arrow" keys—up, down, left, or right—the frame processor memory read-out is offset in the respective direction by one pixel. Pixels which are "shifted out" of the 512 by 512 field are zero'ed. The keys can be automatically repeated by depressing the "repeat" key with the key to be auto-repeated. The "home" key causes the memory read-out offsets to be returned to zero.

This mode continues until the operator enters the "return" key. At that time, the frame processor is left with the resulting memory read-out offset.

For cyclic studies the 4 on-line images are transferred into 4 separate frame processors. (The operator does not control which frame processors. The non-interlaced 124, the 2 ALU's 113 and 117 and the display 122 frame processors are used.)

The operator selects the time desired between updates of the image on the real-time monitor.

The following menu is acted upon here:

| Select delay time (in seconds) between frames: | |
|---|---|
| 1. 0.03 | 2. 0.5 |
| 3. 1.00 | 4. 5.0 |
| 5. 10.0 | |

Once the selection is made, the images are gated.

To the display, in order, at the specified frequency, the process will continue until the stop selection is made.

The following menu, without the main strip, is acted upon here:

CYCLIC STUDIES

1. Stop cycling and backup

Maskless subtraction causes a high pass filtering operation to be performed on the selected on-line image. This filter is implemented as a "gradient image" where each pixel is replaced by the difference between itself and its adjacent pixel. (This can be thought of as the image being shifted 1 pixel and subtracted from itself.) The filtered image is scaled before being displayed on the Deanza monitor.

ARCHIVAL TASK

The archiving process consists of three primary functions:

A. Transfer of images from selected source to appropriate destination.
B. Mounting of archival media (computer compatible tape or floppy diskette.)
C. Dismounting of archival media (computer compatible tape or floppy diskette.)

At this level the operator can select one of these three primary functions.

Where applicable, operator menu selections are confirmed by changing the display of that menu choice. The following menu is acted upon at this level:

ARCHIVAL

1. Transfer
2. Mount media
3. Dismount media

For transfer the operator will choose one of the four possible sources of images (frame processor, wide band tape, archival media, or on-line storage). For the first three the destination will always be on-line storage. If the source was chosen to be on-line storage the possible destinations would be arcnival media or frame processor.

The following menu is acted upon at this level:

TRANSFER FROM

1. Wide band tape
2. Frame processor
3. Archival media
4. On-line storage to archival media
5. On-line storage to frame processor To transfer from wide band tape to on-line storage the operator is required to select the transfer mode, WBT tape speed, and the "on-line" disk file onto which the image will be transferred. The operator is able to obtain information regarding the content of the "on-line" files. When a WBT image has been selected for transfer, information is stored in the header for the selected "on-line" file. This information falls into two catagories. The first catagory consists of image label information and serves to uniquely identify the image. This information is obtained from the WBT header for the image and includes: patient ID, date, time, frame count, and protocol name. The second catagory consists of image statistics computed during image transfer. These statistics include: a 10-bit histogram, minimum, maximum, and mean 10-bit pixel values.

The following menus are acted upon at this level:

| WBT TO "ON-LINE" STORAGE |
| --- |
| Choose destination file<br>1. File A 2. File B 3. File C<br>4. File D 5. Show on-line files |

Select WBT playback rate

1. Fast
2. Medium
3. Slow

Choose access mode

1. WBT scan
2. WBT search

In WBT scan mode wide band tape recorder playback is initiated by the operator. The operator has the capability of controlling playback and display on the real-time monitor of images to facilitate selection of the image to be transferred.

The following menus are acted upon at this level:

WBT Scan mode

1. Initiate forward playback
2. Initiate fast reverse

1. Freeze frame
2. Continue scan
3. Transfer frame to disk
4. Abort (stop recorder and backup)

In the WBT search mode the operator is required to enter the image label information (described above) with the exception of protocol name. WBT playback is initiated by the software. Comparison of WBT image headers with operator supplied label information is performed by the hardware. When a match is found the WBT will stop. If the operator omits any of the required image label information, the missing item is interpreted as a "don't care" and no comparisons are made on that item. When the operator selects transfer frame to disk, the corresponding image is transferred to the selected "on-line" file.

The following menus will be acted upon at this level:

| WBT SEARCH |
| --- |
| Enter image label information |
| Date:<br>Time:<br>Patient ID:<br>WBT frame number:<br>1. Initiate Search<br>2. Initiate Fast Reverse<br>1. Transfer frame to disk<br>2. Abort (stop recorder and backup) |

When doing transfer from frame processor to "on-line" file onto which the image will be transferred. The operator is able to obtain information regarding the content of the "on-line" files. The operator also indicates the frame processor from which the image will be transferred. Headers for retrieved images will generated as described above. The image in the "on-line disk" file will be uniquely identified.

The following menus are acted upon at this level:

---
FP TO ON-LINE STORAGE

Select destination file
1. File A 2. File B 3. File C 4. File D
5. Show on-line files
    SELECT FRAME PROCESSOR
1. Display FP 2. NI 3. I1 4. I2 5. ALU1
6. ALU2
---

To transfer from archival media to on-line storage the operator selects the medium from which image(s) will be transferred. He then selects one of three modes of image transfer (search, scan, or next image) and the destination "on-line" file. Before selecting an "on-line" file the operator may, be making the appropriate menu selection, obtain textual descriptions of the "on-line" files.

The following menus will be acted upon at this level:

---
ARCHIVAL MEDIA TO ON-LINE STORAGE

Select destination file
1. File A 2. File B 3. File C 4. File D
5. Show on-line files
---

SELECT ARCHIVAL MEDIUM

1. Hard Disk
2. Floppy Diskette
3. Computer Compatible Tape

SELECT RETRIEVAL MODE

1. Search
2. Scan
3. Next Mode

In the archival media search mode the operator uniquely identifies the image to be searched for by supplying patient ID, date, and time. If found the image will be transferred into the designated "on-line" file. If any item for identification of an image is omitted, that item is interpreted as a "don't care" and is not considered during image search.

The following menus will be acted upon at this level:

---
ARCHIVAL MEDIA SEARCH

Enter image label information
Date:
Time:
Patient ID:
WBT Frame Number:
---

ARCHIVAL MEDIA SEARCH

1. Transfer frame to disk
2. Abort (Backup)

For archival media scan the operator manually steps through the stored images for which image identification information will be displayed. Once the operator has arrived at the desired image he selects it for transfer.

The following menu is acted upon at this level:

SCANNING ARCHIVAL MEDIA

1. Transfer frame to disk
2. Continue

By selecting next image the next sequential image on the archival medium is transferred. No further operator interaction is required for this function and no menus are associated with it.

To go from on-line storage to archival media the operator selects one of the following three transfer A. New—The medium is assumed to contain no data and any previous images will be overwritten. Tne next image transferred will reside on the medium as the first image.

B. Append—The medium is assumed to contain data. The next image transferred will be written after the last image on the medium. This does not apply to floppy diskette as an archival medium.

C. Replace—The medium is assumed to contain data. The next image transferred will replace the last image on the medium.

The operator selects the storage medium (computer compatible tape, floppy diskette, or hard disk). The software emulates sequential storage for random access storage media so that transfers for different media can be handled in a similar fashion.

The operator will select the "on-line" file that holds the image to be stored. The capability will exist for the operator to examine information regarding the current contents of the "on-line" files.

The following menus are acted upon at this level:

---
ON-LINE STORAGE TO ARCHIVAL MEDIA

Select "on-line" file (source)
1. File A 2. File B 3. File C 4. File D
5. Show on-line files
---

Select ARchival Media

1. Hard Disk
2. Floppy Diskette
3. Computer Compatible Tape

Select Access Mode

1. New
2. Append
3. Replace

In going from on-line storage to frame processor the operator selects the "on-line" file from which the image will be transferred and identify to which frame processor is to hold the image. The operator can request display of information regarding the current contents of the "on-line" files.

The following menus are acted upon at this level:

---
ON-LINE STORAGE TO FP

Select On-Line File
1. File A 2. File B 3. File C 4. File D
5. Show File Contents
    Select Frame Processor
1. Display FP 2. NI 3. I1 4. I2 5. ALU1
6. ALU2
---

For "mount archival media", the operator selects what medium is to be mounted. The operator has the option to mount a new or old floppy diskette when mount new floppy is selected the floppy is initialized before it is mounted, otherwise, it is just mounted.

The following menu is acted upon at this level:

DISMOUNT ARCHIVAL MEDIA

Indicate which Medium

1. Computer compatible tape
2. Floppy Diskette (New)
3. Floppy Diskette (Old)

For "dismount archival media", the operator selects the medium to be dismounted.

The following menu is acted upon at this level:

DISMOUNT ARCHIVAL MEDIA

Indicate which Medium

1. Computer Compatible
2. Floppy Diskette

SYSTEMS DATA BASE

The systems data base consists of various files that contain menus, voice vocabulary, on-line storage for images, and archived imagery.

| | ISC TERMINAL MENU FILES: |
|---|---|
| Name: | Menu. IN |
| Description: | Menus. Menus out is created from this file. |
| Name: | Menus OUT |
| Description: | File containing ISC compatible data. Menus are retrieved from this file when they are needed for display by the system. |
| Name: | Box. OUT |
| Description: | Information for each corresponding MENU. IN MENUS. OUT. |
| | VOICE VOCABULARY FILES: |
| Name: | VOCABULARY |
| Description: | ASCII editable file containing system vocabulary words. The VRT will respond with these words when the users utterence matches a corresponding reference pattern. |
| Name: | REFPAT.DAT |
| Description: | Contains VRT reference patterns corresponding to the system vocabulary words. |
| | ON-LINE IMAGE FILES: |
| Name: | FILEA.IMG<br>FILEB.IMG<br>FILEC.IMG<br>FILED.IMG |
| Description: | Each file contains an image. These files support archival transfers and image analysis. |
| | ARCHIVAL IMAGE FILES: |
| Name: | FILE1.IMG<br>FILE2.IMG<br>FILE3.IMG |
| Description: | Images stored on computer compatible tape, tape, hard disk, or floppy disk for later use by the system.<br>No names will be associated with archival image files on computer compatible tape |
| | PROTOCOL DIRECTORY FILE: |
| Name: | PROTO.PDY |
| Description: | List of protocol names for all protocols currently available. |
| | PROTOCOL FILE |
| Name: | P####.PTL (Where: #### is the protocol number) |
| Description: | Contains information necessary for the software to provide appropriate control over the system for execution of a protocol. Also contains some bookeeping data. |
| | IES FUNCTIONS DESCRIPTION FILE |
| Name: | IESFUN.DSC |
| Description: | Descriptions each defined IES function |
| | SYSTEM DEFINITION FILE |
| Name: | CAMTEK.DEF |
| Description: | Definition of system parameters. These parameters are used to tailor operation of the system to certain unique customer equipment configurations and desired manu colors. |
| | IES STATUS FILE |
| Name: | CAMSTAT.DAT |
| Description: | Contains current IES status mask word |
| | ERROR MESSAGE FILE |
| Name: | MESSAGE.DAT |
| Description: | Contains the textual descriptions of all possible error conditions. Used for reporting of errors. |
| | FRAME PROCESSOR/DEANZA ITT FILE |
| Name: | ITTS.DAT |
| Description: | Contains ITT data for loading the frame processor and video display unit 47 hardware ITT's. This file includes data representing the following fram processor ITT functions (listed below in specified order):<br>1. Linear Ramp Functions<br>2. Natural LDG Function<br>3. Square Roof Law<br>4. Exponential Law<br>5. Square Law<br>6. Zero |
| | FRAME PROCESSOR MACRO DEFINITION FILE |
| Name: | MACROS.DAT |
| Description: | Contains frame processor macro definitions. |

What is claimed is:

1. Apparatus for processing a fluoroscopic image comprising:

a. a television camera operating at a frame rate of at least 30 frames per second providing an analog video output;

b. means to digitize series of individual frames of said analog video output to provide frames of digital image information representative of the analog signal;

c. a plurality of frame processors coupled in series for carrying out arithmetic and logical operations on said frames of digital image information coupled to receive the output of said digitizer;

d. a 2-D digital finite impulse response filter operable on said individual frames of digital image information coupled to said frame processors;

e. means to convert frames of digital image information processed in said frame processors and 2-D filter back into frames of an analog signal; and f. a television display coupled to the output of said means to convert for displaying said processed signal.

2. Apparatus according rto claim 1, wherein said 2-D digital finite impulse response transversal filter is coupled to receive an input from one of said frame processors and to provide its output to another of said frame processors.

3. Apparatus according to claim 2, wherein said television camera has an interlaced scan and wherein a first frame processor is provided for deinterlacing said interlaced scan to put the scan lines in sequential order and second and third frame processors are provided to reinterlace the digital information after processing and before conversion back into an analog signal.

4. Apparatus according to claim 3, wherein in addition to said first, second and third frame processors three additional frame processors are provided, fourth and fifth frame processors for use in carrying arithmetic and logic operations and a sixth frame processor for use as a display buffer.

5. Apparatus according to claim 5, wherein each of said frame processors is capable of performing the following arithmetical and logical operations: add, subtract, exclusive or, negate and image intensity transformation, each frame processor including its own microprocessor controller for controlling which of the functions said frame processor performs.

6. Apparatus according to claim 5, and further including a host processor having an interactive terminal, said host processor providing command inputs to said frame processors to select which function is to be performed.

7. Apparatus according to claim 6, and further including a host processor having an interactive terminal, said host processor providing command inputs to said frame processors to select which function is to be performed.

8. Apparatus according to claim 7, wherein said 2-D digital finite impulse response transversal filter has inputs to select different modes of operation and wherein said host processor is coupled to interactively provide commands to said 2-D filter to select a mode of operation.

9. Apparatus according to claim 8, wherein said interactive terminal associated with said host computer includes keyboard, light pen and voice actuated inputs.

10. Apparatus according to claim 9, wherein said host computer has stored therein a plurality of protocols each corresponding to a predetermined system configuration of said frame processors and 2-D filter, said protocols selectable by an operator through said interactive terminal.

11. Apparatus according to claim 6, and further including a disc drive coupled to said host computer.

12. Apparatus according to claim 11, wherein the output of said 2-D filter is coupled to a display frame processor and wherein said display frame processor is coupled such that its contents may be stored on said disk drive.

13. Apparatus according to claim 8, and further including a tape drive for said host computer.

14. Apparatus according to claim 8, wherein said different modes of operation correspond to different pass bands for said filter.

15. Apparatus according to claim 1, and further including a wide-band tape recorder having an input and an output and means for coupling said frames of digital image information to the input of said wide-band tape recorder before processing and means for coupling the output of said wide-band tape recorder to said frame processors and 2-D filter whereby unprocessed digitized information may be recorded on said wide-band tape recorder and subsequently played back through said system.

16. Apparatus according to claim 15, wherein said means for coupling includes means to pack and unpack information when being written onto and read from said tape recorder so as to use all channels on said tape recorder.

17. Apparatus according to claim 16 and further including means to insert header information along with each frame of date recorded on sold wide-band tape recorder.

18. Apparatus according to claim 17, and further including a video color display system adapted to provide pseudo-color, gray scale thresholding, gray expansion, and contrast enhancement.

19. Apparatus according to claim 18, wherein said display system includes a cursor and further including a joystick coupled to drive said cursor, asid joystick coupled ot said host computer, said host computer linear and area computations of cursor movement.

20. Apparatus according to claim 1, wherein each of said means to digitize, plurality of frame processors, 2-D filter, and means to convert are operable at the frame rate of said television camera.

21. Apparatus according to claim 20, wherein said frame rate is at least 20 frames per second and each individual frame contains a matrix of at least 512 by 512 pixels, each with a resolution of at least 10 bits.

22. Apparatus according to claim 21, and further including a host processor having an interactive terminal, said host processor providing command outputs to said 2-D filter to select said weighting coefficients.

23. Apparatus according to claim 20, wherein said finite inpulse response transversal filter includes an N by N pixel scanning kernal where N is an odd number, such that there will be a pixel element at the center of said kernal surrounded by rings of pixels, said filter acting to cause said kernal to scan a frame of pixels, and to assign as a new value to each pixel a value determined by weighting the center pixel and the pixels in each of the rings of pixels in said kernal surrounding said center pixel, said weighting being determined by weighting coefficients.

24. A method of performing a diagnostic procedure on a person comprising:
   a. passing a radio opaque medium through a body passage in the person being examined and irradiating the area of the body containing said body passage with X-radiation while doing so;
   b. converting said X-radiation to a visible image and viewing said visible image with a television camera having a frame rate of at least 30 frames per second;
   c. digitizing the output of said television camera at a frame rate of at least 30 frames per second in real time to obtain individual frames of digitized image information representative of said body passage containing said radio opaque medium;
   d. filtering said individual frames of said digitized image information in a 2-D filter; and
   e. displaying said filtered image.

25. The method according to claim 24, and further including adding some of the original image back to the filtered image.

26. The method according to claim 20, comprising storing the digitized information before processing on a wide-band tape recorder.

27. The method according to claim 22, and further comprising also storing header information on each frame.

28. The method according to claim 23, wherein said header information includes information identifying the person being examined and information indicating the configuration of the system at the time said data was recorded.

29. The method according to claim 24, and further including playing back said data from said wide-band tape recorder and reanalyzing said data with a different system configuration.

* * * * *